United States Patent
White

(10) Patent No.: US 10,515,122 B2
(45) Date of Patent: Dec. 24, 2019

(54) TOKEN STREAM PROCESSOR AND MATCHING SYSTEM

(71) Applicant: Simply Measured, Inc., Seattle, WA (US)

(72) Inventor: Andrew White, Mountain Home, AR (US)

(73) Assignee: Simply Measured, Inc., Seattle, WA (US)

( * ) Notice: Subject to any disclaimer, the term of this patent is extended or adjusted under 35 U.S.C. 154(b) by 1077 days.

(21) Appl. No.: 14/939,839

(22) Filed: Nov. 12, 2015

(65) Prior Publication Data

US 2017/0140069 A1     May 18, 2017

(51) Int. Cl.
*G06F 16/00*     (2019.01)
*G06F 16/903*     (2019.01)
(Continued)

(52) U.S. Cl.
CPC .. *G06F 16/90344* (2019.01); *G06F 16/24568* (2019.01); *G06F 16/285* (2019.01)

(58) Field of Classification Search
None
See application file for complete search history.

(56) References Cited

U.S. PATENT DOCUMENTS 7,953,746 B1 * 5/2011 Garg .................. G06F 16/9032 707/762
8,180,376 B1    5/2012 Merritt
(Continued)

FOREIGN PATENT DOCUMENTS

| EP | 2 304 595 | 4/2011 |
|----|-----------|--------|
| WO | 2009/140293 A1 | 11/2009 |
| WO | 2014/105499 A1 | 7/2014 |

OTHER PUBLICATIONS

Diao et al., "YFilter: Efficient and Scalable Filtering of XML Documents," *Proceedings of the 18th International Conference on Data Engineering*, San Jose, CA, Feb. 26-Mar. 1, 2002, pp. 341-342.

(Continued)

*Primary Examiner* — Son T Hoang
(74) *Attorney, Agent, or Firm* — Seed Intellectual Property Law Group LLP

(57) ABSTRACT

Systems and methods for providing a functional style matching language and high performance token stream processor and matching system. A query compiler may be used to generate a matching engine which ingests input tokens received from a tokenizer. Tokens may be expanded during the compiler phase and may be used to pre-populate a matching engine with interesting forms of the words. Both the tokenizer and the matching engine agree on a normalization of inputs. In some implementations, the matching engine utilizes a mixed push/poll architecture, which increases the speed of matching while reducing memory requirements. In some implementations, the matching engine is able to match all queries in a single pass over an input token stream without backtracking. In some implementations, the query compiler and matching engine merge multiple queries into a unified matching engine which outputs which (if any) input queries are matched by the input.

26 Claims, 19 Drawing Sheets

(51) Int. Cl.
   *G06F 16/28*     (2019.01)
   *G06F 16/2455*   (2019.01)

(56) References Cited

U.S. PATENT DOCUMENTS

| | | | |
|---|---|---|---|
| 2003/0069880 A1* | 4/2003 | Harrison | G06F 16/3334 |
| 2003/0154070 A1* | 8/2003 | Tokuda | G06F 17/274 |
| | | | 704/9 |
| 2004/0133672 A1* | 7/2004 | Bhattacharya | H04L 63/1416 |
| | | | 709/224 |
| 2005/0187942 A1* | 8/2005 | Dutta | H04L 29/06 |
| 2006/0179133 A1 | 8/2006 | Mariani et al. | |
| 2007/0180523 A1 | 8/2007 | Jablonski et al. | |
| 2008/0189262 A1 | 8/2008 | Peng et al. | |
| 2008/0222117 A1 | 9/2008 | Broder et al. | |
| 2009/0132352 A1 | 5/2009 | Kerven et al. | |
| 2009/0265233 A1 | 10/2009 | Sendo et al. | |
| 2009/0282052 A1 | 11/2009 | Evans et al. | |
| 2010/0082333 A1* | 4/2010 | Al-Shammari | G06F 17/2735 |
| | | | 704/10 |
| 2010/0318611 A1 | 12/2010 | Curtin et al. | |
| 2011/0307579 A1 | 12/2011 | Izrailevsky et al. | |
| 2011/0313996 A1 | 12/2011 | Strauss et al. | |
| 2012/0136649 A1 | 5/2012 | Freising et al. | |
| 2013/0054433 A1 | 2/2013 | Giard et al. | |
| 2013/0066711 A1 | 3/2013 | Liyanage et al. | |
| 2013/0124596 A1 | 5/2013 | Damman et al. | |
| 2014/0108531 A1 | 4/2014 | Klau | |
| 2014/0278864 A1 | 9/2014 | Stanislaw et al. | |
| 2014/0337383 A1 | 11/2014 | Boyle et al. | |
| 2014/0372956 A1* | 12/2014 | Bisca | G06F 16/93 |
| | | | 715/848 |
| 2015/0169582 A1 | 6/2015 | Jain et al. | |
| 2015/0169734 A1 | 6/2015 | Jain et al. | |

OTHER PUBLICATIONS

Extended European Search Report, dated Jul. 26, 2018, for European Application No. 16865074.5-1217, 9 pages.
International Search report and Written Opinion of the International Searching Authority, dated Feb. 27, 2017, for International Application No. PCT/US2016/061522, 16 pages.
"Core Concepts-Facebook Developers," retrieved on Feb. 7, 2013, retrieved from http://developers.facebook.com/docs/coreconcepts/, 1 page.
International Search Report, dated Jun. 13, 2014, for USAN PCT/US2014/017171, 3 pages.
"Open Graph Overview," retrieved on Feb. 7, 2013, retrieved from https://developers.facebook.com/docs/concepts/opentgraph/overview, 2 pages.
"Open Graph Tutorial," retrieved on Feb. 7, 2013, retrieved from https://developers.facebook.com/docs/technical-guides/opengraph/opengraph-tutorial, 11 pages.
"The Open Graph Protocol," retrieved on Feb. 7, 2013, retrieved from http://ogp.me/, 6 pages.
Walsh, David, "Facebook Open Graph META Tags," retrieved on Feb. 25, 2013, retrieved from http://davidwalsh.name/facebook-meta-tags, 4 pages.
Written Opinion, dated Jun. 13, 2014, for USAN PCT/US2014/017171, 7 pages.

* cited by examiner

TOKEN STREAM PROCESSOR AND MATCHING SYSTEM

BACKGROUND

Technical Field

The present disclosure generally relates to systems and methods of matching data using a plurality of queries.

Description of the Related Art

Information retrieval is the activity of obtaining information resources relevant to an information need from a collection of information resources. Searches can be based on metadata or on full-text (or other content-based) indexing. An information retrieval process typically begins when a user enters a query into the system. Queries are statements of information needs, for example, search strings in search engines. In information retrieval, a query generally does not uniquely identify a single object in the collection. Instead, several objects may match the query, perhaps with different degrees of relevancy. An object is an entity that is represented by information in a database. User queries are matched against the database information. Depending on the application, the data objects may be, for example, text documents, images, audio, or videos.

BRIEF SUMMARY

A token stream processor and matching system may be summarized as including at least one nontransitory processor-readable storage medium which stores a plurality of input queries and which stores at least one input token stream comprising a plurality of ordered input tokens; and at least one processor communicatively coupled to the at least one nontransitory processor-readable storage medium and which implements a query compiler which compiles the plurality of input queries into a unified matching engine, the unified matching engine in operation ingests the at least one input token stream and determines which of the plurality of input queries, if any, match the at least one input token stream. The unified matching engine may include a plurality of sub-matcher nodes which in aggregate form a matcher tree that begins with a plurality of leaf sub-matcher nodes which receive the input token stream and terminates in a single terminal sub-matcher node. At least some of the plurality of sub-matcher nodes may include a poll sub-matcher node which notifies observer sub-matcher nodes of match results responsive to requests received from the respective observer sub-matcher nodes. At least some of the plurality of sub-matcher nodes may include a push sub-matcher node which autonomously notifies observer sub-matcher nodes of match results. Query compiler may compile the plurality of input queries into a unified matching engine, and the poll sub-matcher nodes are used for matching conditions determined to be relatively common. For each of the plurality of sub-matcher nodes except for the terminal sub-matcher node, the unified matching engine may identify any match which could be invalidated as a conditional match. For each match identified as a conditional match, the terminal sub-matcher node may evaluate at least one invalidating condition of the match. The query compiler may expand the at least one input token stream to include at least one variation of at least one token in the at least one input token stream. At least one token in the input token stream may include a textual token, and the query compiler expands the at least on textual token to include at least one of a conjugation, pluralization, contraction, comparative, or superlative of the textual token. The unified matching engine may receive input tokens which are normalized with respect to at least one of letter case or property name. At least some of the plurality of input queries may be associated with a first entity, and at least some of the plurality of input queries may be associated with a second entity, the second entity different from the first entity. The input token stream may include at least one of a text document or a complex object with multiple object properties. The unified matching engine may generate a matching context for the at least one input token stream which stores state data and input data produced by the unified matching engine. The unified matching engine may include a plurality of sub-matcher nodes, at least one of the sub-matcher nodes including a cluster matcher node which determines that a match is present if all positive dependencies match and satisfy at least one matching restriction, the at least one matching restriction relating to at least one of token spacing or cluster span size. The unified matching engine may include a plurality of sub-matcher nodes, at least one of the sub-matcher nodes including a decoration matcher node which, for each match, decorates the match with a key-value pair and autonomously passes the match to observer sub-matcher nodes of the respective sub-matcher node. The unified matching engine may include a plurality of sub-matcher nodes, at least one of the sub-matcher nodes including an ordered phrase matcher node which matches input tokens in the at least one input token stream based at least in part on a determined ordering of the input tokens.

A method of operating a token stream processor and matching system may be summarized as including receiving, by at least one processor, a plurality of input queries; compiling, by the at least one processor, the plurality of input queries into a unified matching engine; ingesting, by the unified matching engine, at least one input token stream comprising a plurality of ordered input tokens; and determining, by the unified matching engine, which of the plurality of input queries, if any, match the at least one input token stream. Compiling the plurality of input queries into a unified matching engine may include compiling the plurality of input queries into a unified matching engine which includes a plurality of sub-matcher nodes which in aggregate form a matcher tree that begins with a plurality of leaf sub-matcher nodes which receive the input token stream and terminates in a single terminal sub-matcher node. Compiling the plurality of input queries into a unified matching engine which may include a plurality of sub-matcher nodes including compiling the plurality of input queries into a unified matching engine which includes a plurality of sub-matcher nodes, at least some of the plurality of sub-matcher nodes include a poll sub-matcher node which notifies observer sub-matcher nodes of match results responsive to requests received from the respective observer sub-matcher nodes. Compiling the plurality of input queries into a unified matching engine which may include a plurality of sub-matcher nodes including compiling the plurality of input queries into a unified matching engine which includes a plurality of sub-matcher nodes, at least some of the plurality of sub-matcher nodes including a push sub-matcher node which autonomously notifies observer sub-matcher nodes of match results. Compiling the plurality of input queries into a unified matching engine may include compiling the plurality of input queries into a unified matching engine, and the poll sub-matcher nodes are used for matching conditions determined to be relatively common. Compiling the plurality of input queries into a unified matching engine may include compiling the plurality of input queries into a unified matching engine, and for each of the plurality of sub-matcher nodes except for the terminal sub-matcher node, the unified matching engine identifies any match which could be invalidated as a conditional match. Compiling the plurality of input queries into a unified matching engine may include compiling the plurality of input queries into a unified matching engine, and for each match identified as a conditional match, the terminal sub-matcher node evaluates at least one invalidating condition of the match. Compiling the plurality of input queries into a unified matching engine may include expanding the at least one input token stream to include at least one variation of at least one token in the at least one input token stream. At least one token in the input token stream may include a textual token, and compiling the plurality of input queries into a unified matching engine may include expanding the at least on textual token to include at least one of a conjugation, pluralization, contraction, comparative, or superlative of the textual token. Ingesting at least one input token stream may include ingesting at least one input token stream having input tokens which are normalized with respect to at least one of letter case or property name. Receiving at plurality of input queries may include receiving a plurality of input queries, at least some of the plurality of input queries are associated with a first entity, and at least some of the plurality of input queries are associated with a second entity, the second entity different from the first entity. Ingesting at least one input token stream may include ingesting at least one input token stream which includes at least one of a text document or a complex object with multiple object properties. Determining which of the plurality of input queries, if any, match the at least one input token stream may include generating a matching context for the at least one input token stream which stores state data and input data produced by the unified matching engine. Compiling the plurality of input queries into a unified matching engine may include compiling the plurality of input queries into a unified matching engine, the unified matching engine includes a plurality of sub-matcher nodes, at least one of the sub-matcher nodes including a cluster matcher node which determines that a match is present if all positive dependencies match and satisfy at least one matching restriction, the at least one matching restriction relating to at least one of token spacing or cluster span size. Compiling the plurality of input queries into a unified matching engine may include compiling the plurality of input queries into a unified matching engine, the unified matching engine includes a plurality of sub-matcher nodes, at least one of the sub-matcher nodes includes a decoration matcher node which, for each match, decorates the match with a key-value pair and autonomously passes the match to observer sub-matcher nodes of the respective sub-matcher node.

Compiling the plurality of input queries into a unified matching engine may include compiling the plurality of input queries into a unified matching engine, the unified matching engine includes a plurality of sub-matcher nodes, at least one of the sub-matcher nodes includes an ordered phrase matcher node which matches input tokens in the at least one input token stream based at least in part on a determined ordering of the input tokens.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
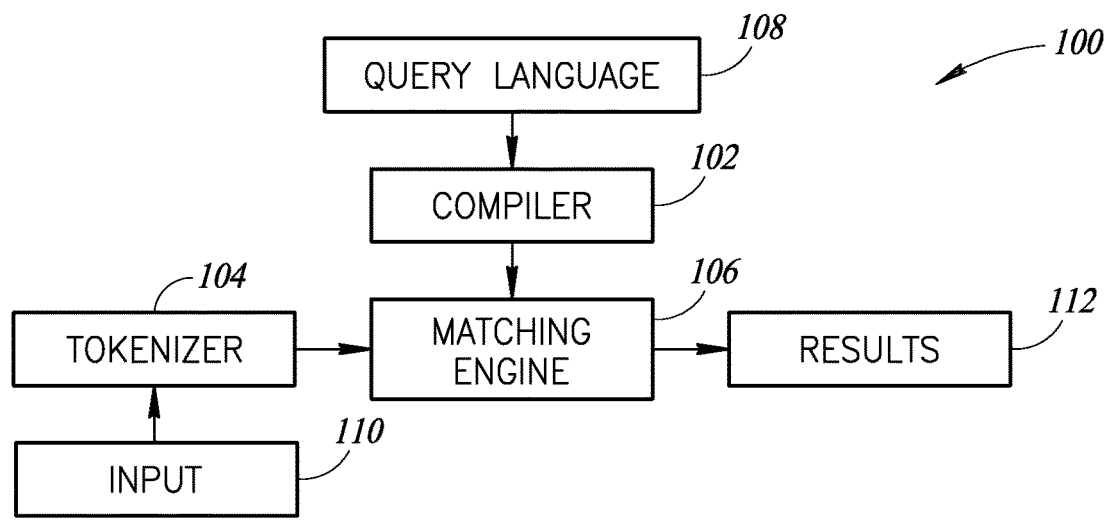
FIG. 1 shows a high-level schematic block diagram of a token stream processor and matching system, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to a functional style matching language and high performance token stream processor and matching system. The implementations disclosed herein may be useful when a business consumes large amounts of data and wishes to correlate that data with a high cardinality of queries in a time and resource efficient manner. For example, a business may wish to determine if a tweet or Facebook® post matches one or more (or none) of thousands of possible queries. A query may include determining if what the author said referred to a particular product name, service, or used a certain phrase. A query may also match against provided descriptions or an author's demographics (e.g., age, gender) if present.

In some implementations, a query compiler is used to generate a matching engine which ingests input tokens received from a tokenizer. When working with natural languages, it is often desirable to track multiple forms of a word. For example, queries for the word "goose" probably should also match references to the word "geese." In general, word conjugations, pluralizations, contractions, comparatives, and superlatives are all expansions of one or more base words. Existing systems apply a method called stemming at the tokenizer layer to try to normalize these words. However, stemming often loses information and is very costly since it must be done for every token.

One or more implementations disclosed herein perform token expansions during the compiler phase and pre-populate the matching engine with all interesting forms of the words. This feature may be fully configurable by the user. By the query compiler expanding the word "goose" to match both "goose" and "geese," the tokenizer is free to pass tokens straight to the matching engine with little preprocessing required.

Natural languages commonly carry the notion of letter "caseness" (e.g., BLUE, Blue, blue). In most instances, the case is irrelevant to the meaning of the word. Generally, it is computationally expensive for the matching engine to look for all possible capitalization of a word. Therefore, in the implementations discussed herein both the tokenizer and the matching engine agree on a normalization of inputs. As an example, a lower-case function may be used for normalization. Complex objects are usually presented in property-name and values pairs. In this case, the matching engine needs to know how to route property tokens to their respective matchers and thus the property name may be used as a normalization function.

As discussed further below, in some implementations the matching engines of the present disclosure utilize a mixed push/poll architecture. In most languages, word usage follows a Zipfian distribution. That is, 80% of the content is represented with 20% of the words. A simple matcher will suffer considerable performance issues if every sub-matcher that contains a common word is triggered for every instance it is encountered. For example, consider the following query patterns:

Query 1: [Phrase I like cars]
Query 2: [Phrase I like trucks]
Query 3: [Phrase I like cats]
Query 4: [Phrase I want money]
Query 5: [Phrase I want fame]

Each of these queries needs to track all occurrences of the word "I," Queries 1-3 need to track "like," and Queries 4-5 need to track "want" as well. Instead of triggering the start of five stateful phrase matchers, the matching engine and compiler of the present disclosure recognize that "I," "like," and "want" are common words and are frequently used in natural language. The query compiler may create specialized matchers which only trigger on the more rare keywords or sub matchers. Backtracking is avoided due to how common words are tracked.

Another aspect of one or more implementations of the matching engine disclosed herein is the ability to match all queries in a single pass over an input token stream. That is, in some implementations there is no backtracking. This is achieved through carefully crafted internal sub-matchers in such a way that any match that could be invalidated is treated as conditional, and their invalidating conditions can be checked quickly, and only if needed, after the matching engine has consumed the entire token stream.

Another feature of one or more implementations discussed herein is the query compiler and matching engine are able to merge multiple queries. Most matching systems simply iterate over the input once for every query, or at best iterate once but send the tokens to N individual matchers. The query compiler and matching engine of the present disclosure take advantage of the tendencies for many queries to share common sub queries. Thus, as the matchers are built, the compiler is always looking for existing equivalent matchers which have already been created by previous queries. For example, consider the following query patterns:

Query 1: [Phrase [AnyOf red blue green yellow purple] car]
Query 2: [Phrase [AnyOf red blue green yellow purple] truck]

These queries may be created by different entities (e.g., customers) or by the same entity wanting to track different features. However, these queries share the common colors subquery. Internally, the query compiler and matching engine recognizes this and produces a matcher with only one color subquery for both phrase subqueries.

Accordingly, as discussed in detail below, the systems and methods discussed herein provide significant improvements to existing computing systems by matching input against numerous queries simultaneously in a time and resource efficient manner.

FIG. 1 shows a high-level schematic block diagram of a token stream processor and matching system 100. The system 100 comprises a query compiler 102, a tokenizer 104, and a matching engine or "matcher" 106. The query compiler 102 receives one or more input queries provided in a query language 108. A user creates input queries in the query language 108 which describe what input the user wishes to match. An example query may be:

[Phrase I like [AnyOf blue red] cars]

This example input query would instruct the query compiler 102 to produce a matcher that would match phrases such as "I like red cars." Note that this example is for textual input but the query language 108, compiler 102 and matching engine 106 extend to arbitrary objects as well.

The query compiler 102 takes one or more queries and creates a single unified matching engine. Advantageously, the compiler 102 may take a plurality of queries and create a unified matcher which does not simply return true/false but indicates which of the plurality of queries the input matched.

The tokenizer 104 receives input 110, which is what the user is trying to match against. The input 110 may be a series of text documents or may be arbitrary complex objects with multiple properties. The tokenizer 104 breaks the input 110 down into smaller pieces or tokens. Generally, there are only two requirements for the tokenizer 104 to work with the matching engine 106. First, the tokenizer 104 should capture where each individual token is located in the input stream. Second, the tokenizer 104 should produce a normalized value, which is a simplified representation of the token which is used to route the token to the correct handlers in the matching engine 106.

The matching engine 106 ingests a token stream from the tokenizer 104 and captures any interesting tokens as described by the input query. As discussed further below, the matching engine 106 may also decorate matches in such a way that it is possible to determine which input queries are matched and why the input queries are matched. The matching engine 106 generates a result 112 as output. The result 112 describe how (if at all) the input 110 matched one or more of the input queries.

Figure 2:
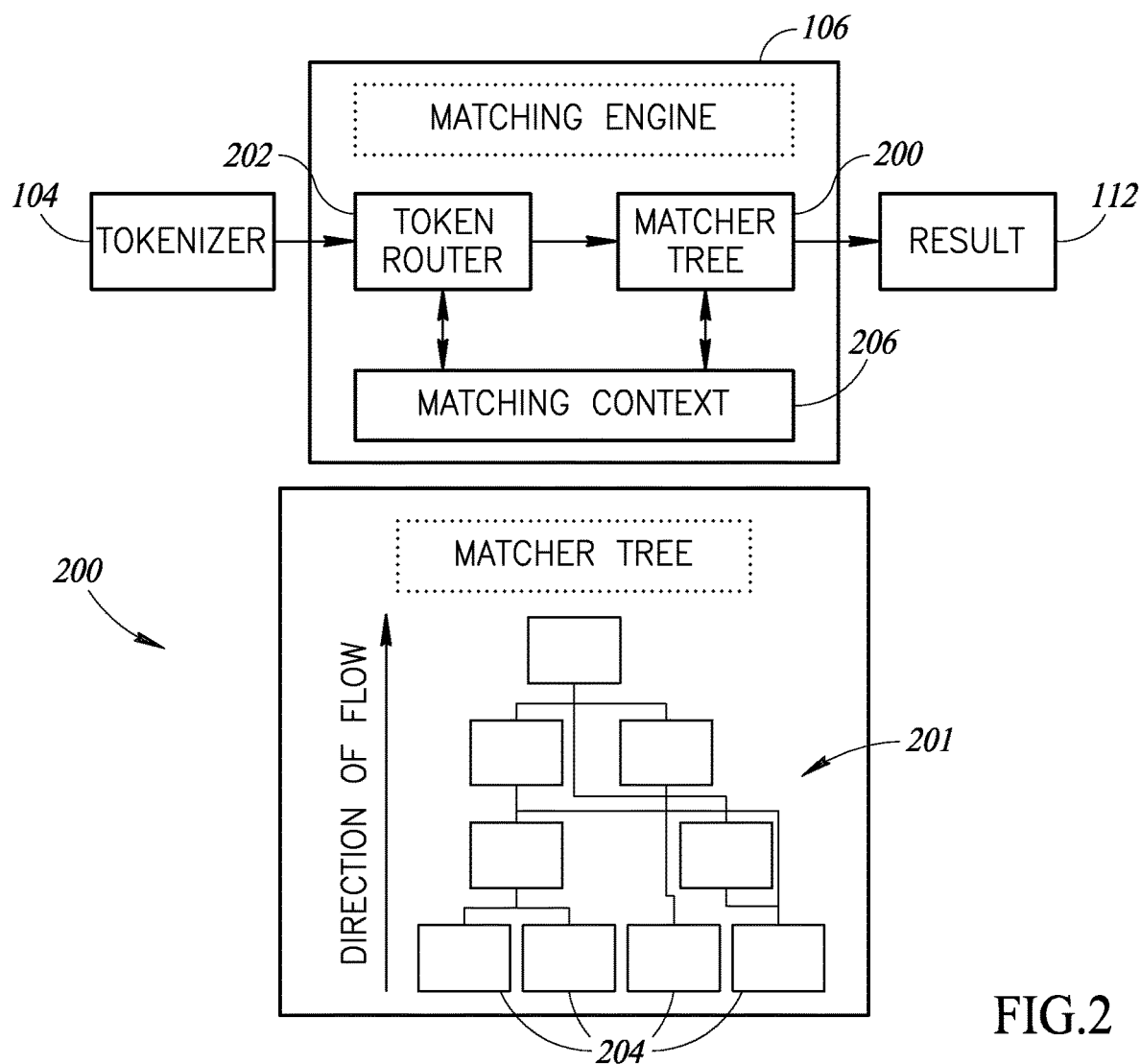
FIG. 2 shows a schematic block diagram of an example architecture for a matching engine of the token stream processor and matching system of FIG. 1, according to one illustrated implementation.

FIG. 2 shows a high level block diagram of an example architecture for the matching engine 106 of FIG. 1 and an example matcher tree 200 which is generated to implement the matching engine. The matcher tree 200 includes a plurality of sub-matcher nodes 201. Each sub-matcher node 201 may be a component which holds the logic of how to decorate, propagate or reject a given match from its dependencies. Multiple types of sub-matchers are discussed below.

The matching engine 106 includes a token router 202 which consumes tokens from an input token stream provided by the tokenizer 104 and routes the tokens to the correct sub-matcher leaf node 204 in the matcher tree 200 via a hash table and a routing key of each respective token. The token router 202 may be immutable once compiled.

The matcher tree 200 includes the sub-matcher leaf nodes 204 which consume tokens from the token router 202. Sub-matcher nodes may then notify their observers if all of the respective node's conditions are met. The matcher tree 202 may be immutable once compiled.

The matching engine 106 also includes a matching context component 206 which holds all mutable states and per-input data produced by the matcher tree 200 and token router 202. A matching context 206 may be generated for every new input token stream. The matching context 206 is discussed further below with reference to FIGS. 11-13.

Figure 3:
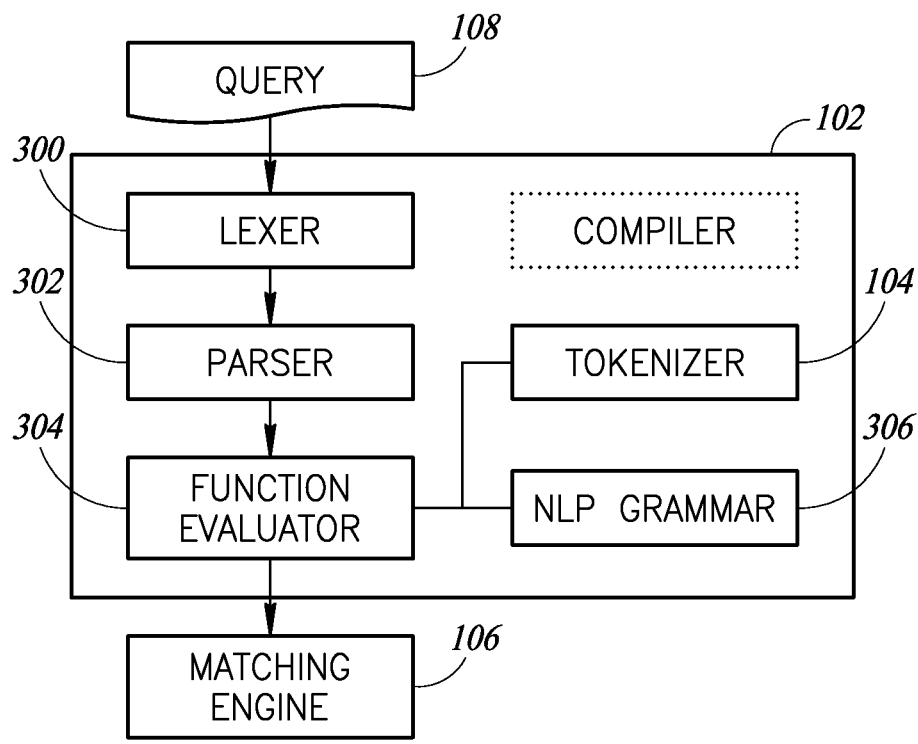
FIG. 3 shows a schematic block diagram for a query compiler of the token stream processor and matching system of FIG. 1, according to one illustrated implementation.

FIG. 3 shows a block diagram of the query compiler 102 of FIG. 1. A lexer 300 receives queries 108 and breaks them into smaller tokens. Next, a parser 302 creates an abstract syntax tree (AST) which is passed to a function evaluator 304. The function evaluator 304 interprets each node in the AST and builds/updates the matching engine 106. Some functions evaluated by the function evaluator 304 utilize the tokenizer 104 and a natural language processing (NLP) grammar component 306 to expand inputs (e.g., expand "cat" to [AnyOf cat cats]).

Figure 4:
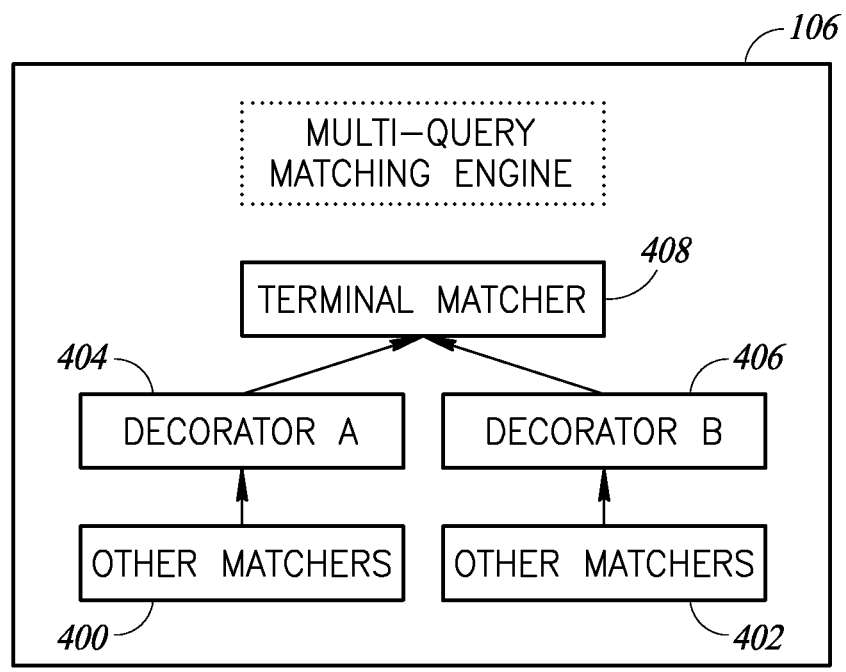
FIG. 4 shows a schematic block diagram of a batch compile lifecycle for a matching engine of the token stream processor and matching system of FIG. 1, according to one illustrated implementation.

FIG. 4 shows a block diagram of a batch compile lifecycle for a multi-query matching engine 106. In some implementations, the query compiler 102 (FIG. 1) compiles and matches multiple queries in batch. In such cases, the query compiler 102 supplies a key for each query, and produces a query map which maps each key to each query. In the example of FIG. 4, there are two queries which have keys A and B. The query compiler 102 iterates over the queries A and B and updates the matching engine 106 to generate matchers 400 for query A and matchers 402 for query B. Decorators 404 and 406 are added between the top-most matcher for the queries A and B, respectively, and a terminal matcher 408. Such allows the user to determine which query a match correlates to after presenting the matching engine 106 with input. Terminal matchers are discussed below with reference to FIGS. 36 and 37.

Figure 5:
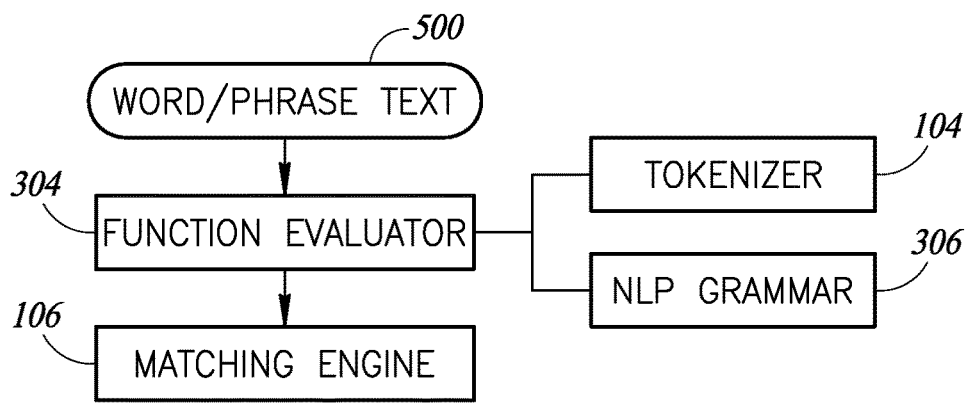
FIG. 5 shows a schematic block diagram of a function evaluator of the token stream processor and matching system of FIG. 1, according to one illustrated implementation.
Figure 6:
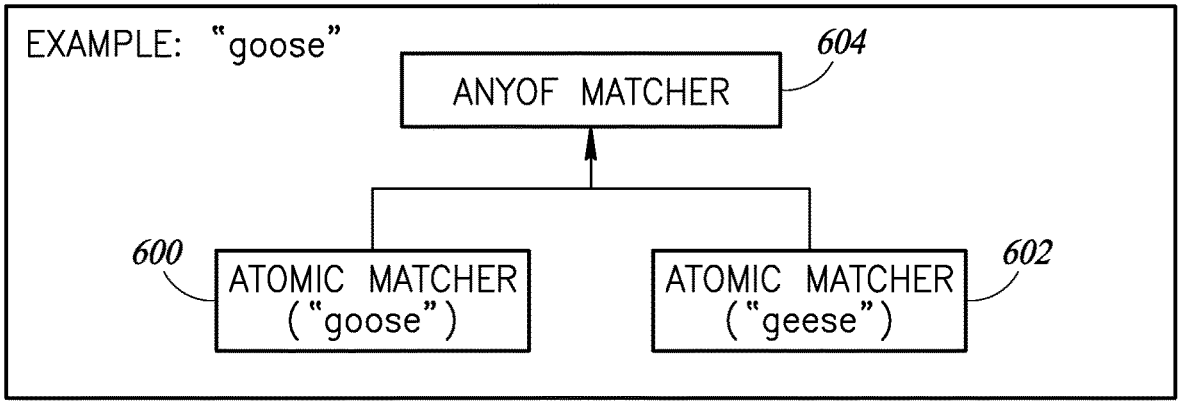
FIG. 6 shows an example of a sub-matcher built for a matching engine built for the word "goose," according to one illustrated implementation.
Figure 7:
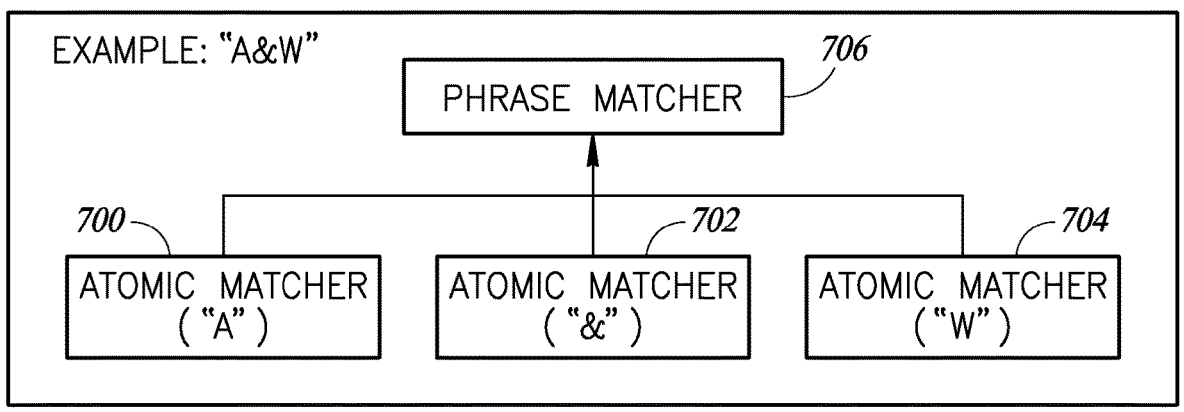
FIG. 7 shows another example of a sub-matcher built for a matching engine built for the phrase "A&W," according to one illustrated implementation.

FIGS. 5-7 show examples of how matchers may be built. In FIG. 5, when bare words or quoted phases are found, the function evaluator 304 uses the tokenizer 104 and NLP grammar 306 components to build a matcher. An example algorithm for this feature may be:

```
function buildMatcher(input);
   tokens = tokenizer.tokenize(input)
   if tokens.size == 1:
      return new AnyOfMatcher(grammar.expand(input))
   else:
      return new PhraseMatcher(tokens)
```

FIG. 6 shows an example wherein a matcher is built for the word "goose." In this example, an atomic matcher 600 is generated for the word "goose" and an atomic matcher 602 is generated for the word "geese." An atomic matcher is a specialized matcher that acts as an entry point to the matcher tree 200 (FIG. 2). The token router 202 (FIG. 2) notifies atomic matchers of any matches. The atomic matchers 600 and 602 are coupled to an AnyOf matcher 604 which acts like a logical OR, such that the AnyOf matcher passes a match along to observer matchers if either goose or geese is matched.

FIG. 7 shows another example wherein a matcher is built for the phrase "A&W." In this example, atomic matchers 700, 702 and 704 are generated for the symbols "a," "&" and "w." The atomic matchers 700, 702 and 704 are coupled to a phrase matcher 706 which, as discussed further below, returns a match when its input tokens match a determined phrase.

Figure 8:
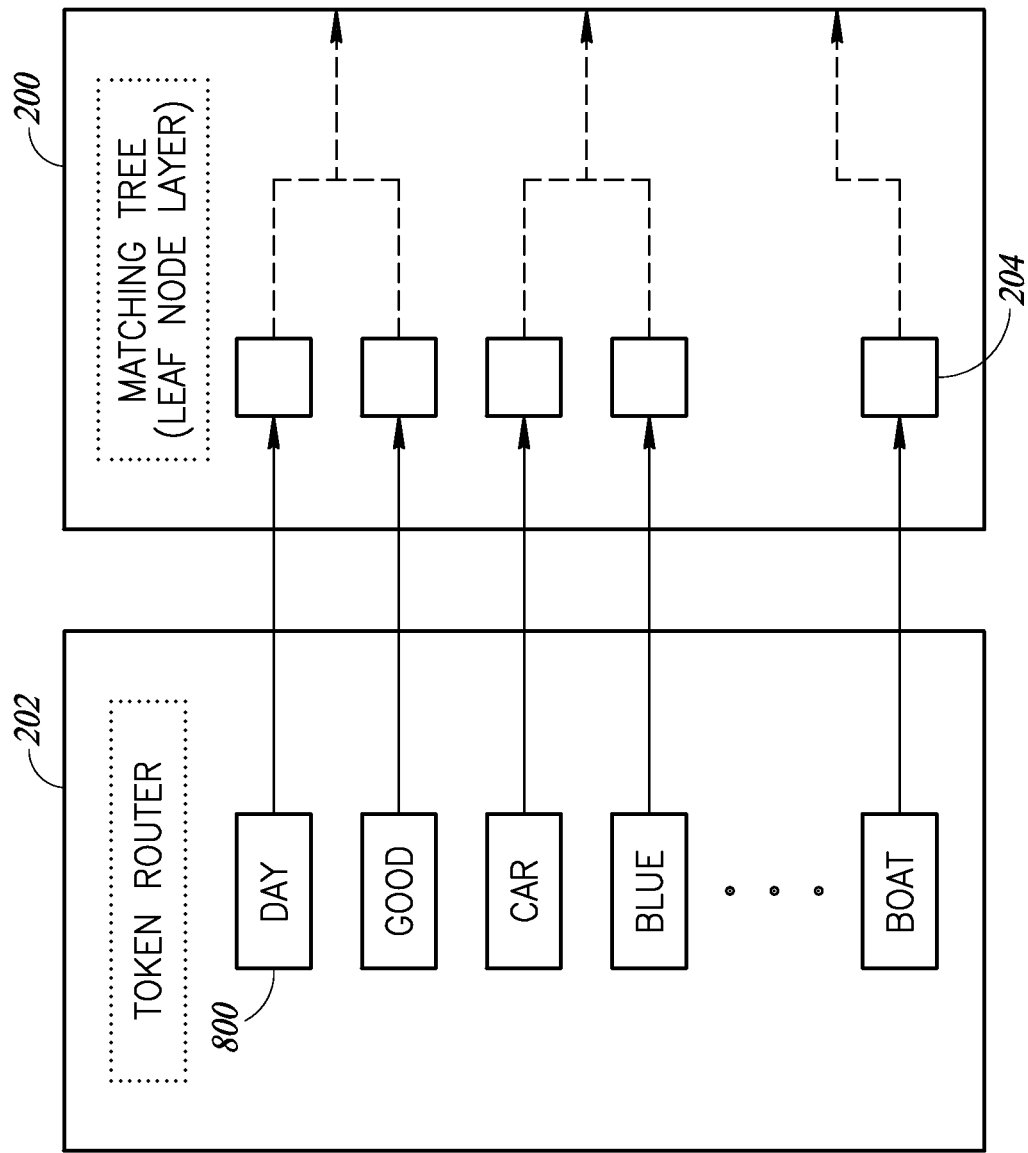
FIG. 8 shows a schematic block diagram of a token router and a leaf node layer of a matching tree, according to one illustrated implementation.

FIG. 8 shows a block diagram of the token router 202 and a leaf node layer of the matching tree 200. Tokens 800 are routed using their "routing value" or "normalized value" property. In some implementations, the token router 202 utilizes a hash map which allows for O(1) lookup time. The token router 202 routes tokens one-to-one to leaf nodes 204 in the matching tree 200. Tokens not in the system 100 may be ignored. An example algorithm for this feature may be:

```
Class TokenRouter
   property valueToMatcherMap
   function Matcher route(token, context);
   routing value = token.getRoutingValue( )
   consumer = valueToMatcherMap.get
(routing Value)
```

```
subMatch = new TokenMatch(token)
context.propgateMatch(subMatch)
```

The above algorithm works for both textual input and complex objects. However, for complex objects, the tokenizer 104 may map property names to the routing value. Sub-matchers then tokenize and match based on the token's raw value.

Figure 9:
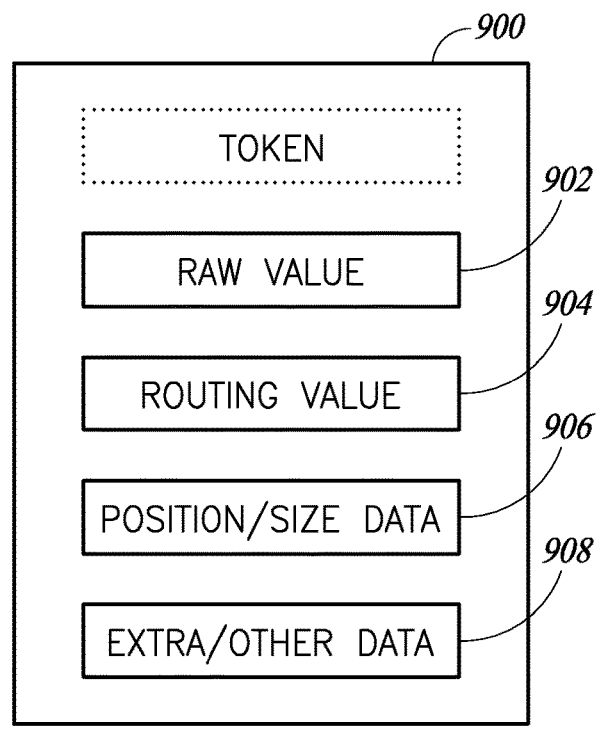
FIG. 9 shows a schematic block diagram of an input token, according to one illustrated implementation.

FIG. 9 shows a block diagram for an input token 900 which may be provided to the matching engine 106 by the tokenizer 104. The token 900 include a raw value 902, routing value 904, position/size data 906, and extra/other data 908. The raw value 902 is the token as it appeared in the token stream. The routing value 904 may be the normalized value (e.g., lower case version) of the token 900. The position/size data 906 identifies where in the input token stream the token 900 resides. For example, the position/size data 906 may identify an ordered number for the token 900 or may identify a character range for the token in the token stream. Extra/other data 908 may include any type of other data, such as decorators, language indicators (e.g., English, Japanese), etc.

A token captures the raw value 902 located between the start and end coordinates of the token. Tokens should also have a routing value 904 which agrees with the normalization strategy used by the query compiler 102 (FIG. 2).

In some implementations, the system may include position sensitive tokenization preconditions and invariants. For example, in some implementations tokens should be emitted from the tokenizer 104 in a strict ordering determined by the following rules of comparison (ordered by priority) between any two tokens:

(1) Select the left-most token according to the two tokens' starting coordinates;

(2) If there is a tie at rule (1), select the right-most token according to the two tokens' ending coordinates;

(3) If there is a tie at rule (2), select any order.

Additionally, in some implementations tokens may overlap so long as the ordering specified above is preserved.

Figure 10:
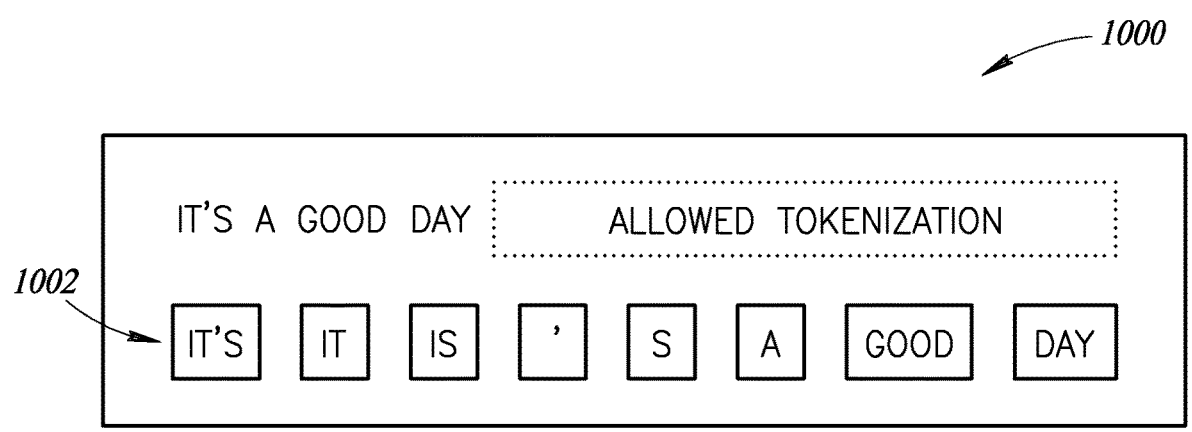
FIG. 10 shows an example diagram of allowed tokenization for an input, according to one illustrated implementation.

FIG. 10 shows an example diagram 1000 of allowed tokenization for the phrase "It's a good day." In this example, the word "It's" has been expanded by the query compiler into the tokens "It's," "It," "Is," "'," and "s." The ordering of the tokens 1002 is in the order specified by the constraints detailed above.

Figure 11:
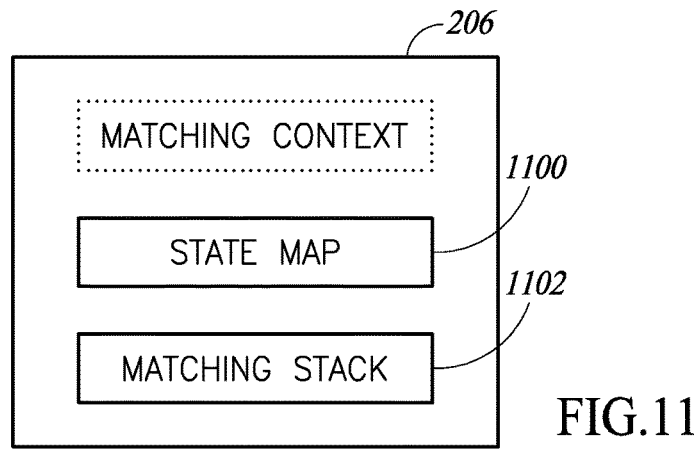
FIG. 11 shows a schematic block diagram of a matching context component of a matching engine, according to one illustrated implementation.

FIG. 11 shows a block diagram of the matching context component 206. The matching context component 206 includes a state map 1100 and a matching stack 1102. The matching context component 206 serves two primary purposes. First, the matching context component 206 provides a centralized point of matcher interactions. Second, the matching context component 206 holds any matcher states.

Figure 12:
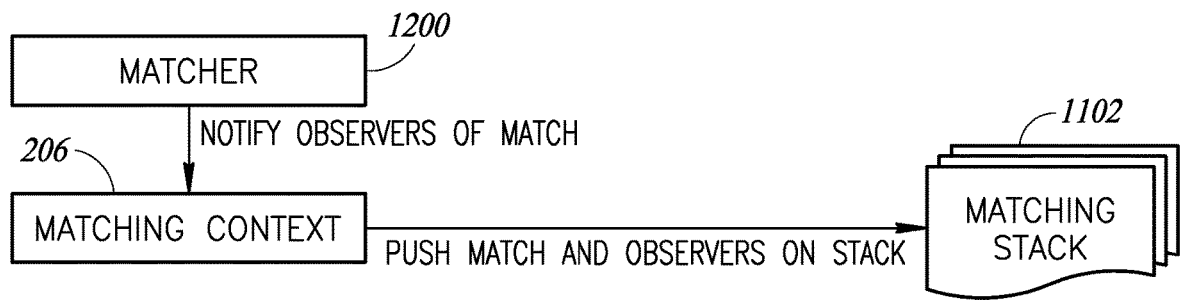
FIG. 12 shows a schematic block diagram of the interaction between a matcher, a matching context component, and matching stack, according to one illustrated implementation.

FIG. 12 shows a block diagram of the interaction between a matcher 1200, the matching context component 206, and the matching stack 1102. Instead of interacting with other matchers directly, matchers proxy requests through the matching stack 1102 of the matching context component 206. The matching engine 106 processes the matching stack 1102 until the matching stack is empty. An example algorithm for implementing such feature is:

```
function processStack( ):
    while matchingStack.isNotEmpty:
        consumersMatchPair = matchingStack.pop( )
        for consumer in consumersMatchPair.getConsumers:
            consumer.consume(this,
consumersMatchPair.match( ))
```

Figure 13:
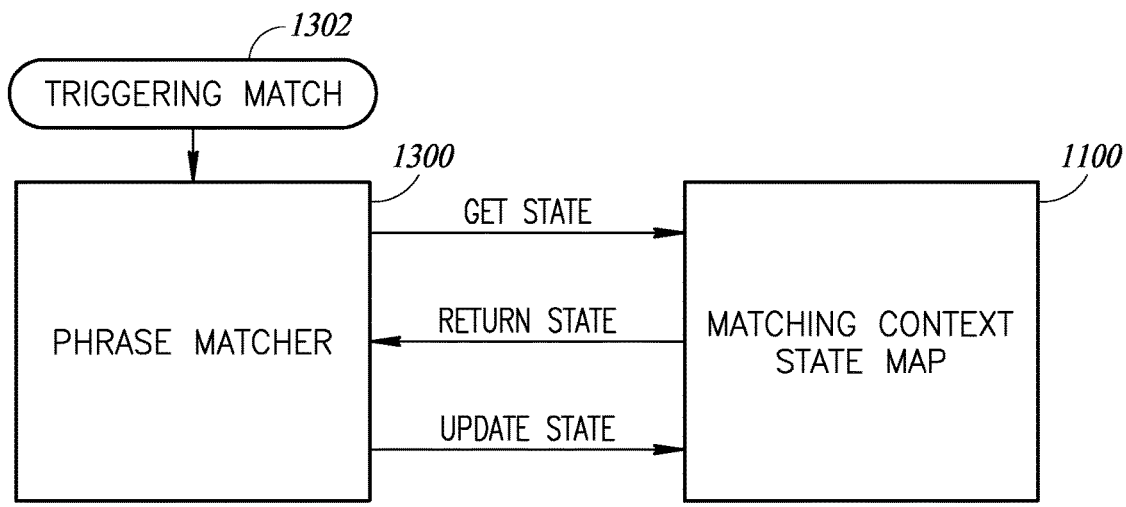
FIG. 13 shows a schematic block diagram of the interaction between a phrase matcher and a state map of a matching context component, according to one illustrated implementation.

FIG. 13 shows a block diagram which illustrates the interaction between a phrase matcher 1300 and the state map 1100 of the matching context component 206. As discussed above, the matching tree 200 (FIG. 2) of the matching engine 106 is static/immutable once compiled. All dynamic states are managed by the matching context component 206. Internally, the matching context component 206 maintains a map of identifiers to state objects. Upon detecting a triggering match 1302, a matcher (e.g., phrase matcher 1300) can request or create a dynamic state within the matching context component 206 via an interface. For example, the phrase matcher 1300 may store partial matches in a dynamic state object stored in the matching context component 206.

The following discussion provides numerous non-limiting examples of matchers or "sub-matchers" which may be used to build a matching tree of a matching engine. As discussed above, generally, a matcher is a component in the matching tree which holds the logic of how to decorate, propagate or reject a given match from its dependencies.

Figure 14:
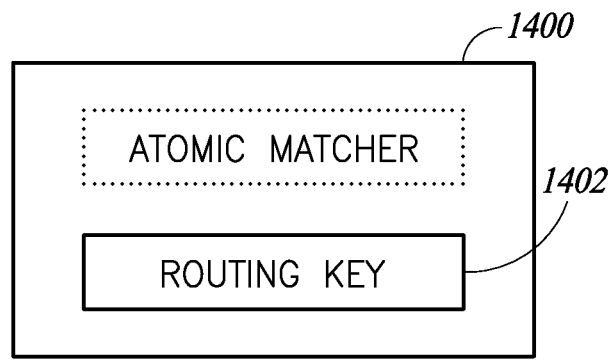
FIG. 14 shows a schematic block diagram for an atomic matcher, according to one illustrated implementation.

FIG. 14 shows an atomic matcher 1400 which comprises a routing key 1402. The atomic matcher 1400 is a trivial matcher that passes all tokens along to its observing matchers. The routing key 1402 is used to uniquely identify an entry point into the matching tree of the matching engine. The token router 202 can only route tokens to atomic matchers 1400. Thus, the atomic matchers comprise leaf nodes in the matching tree of the matching engine.

Figure 15:
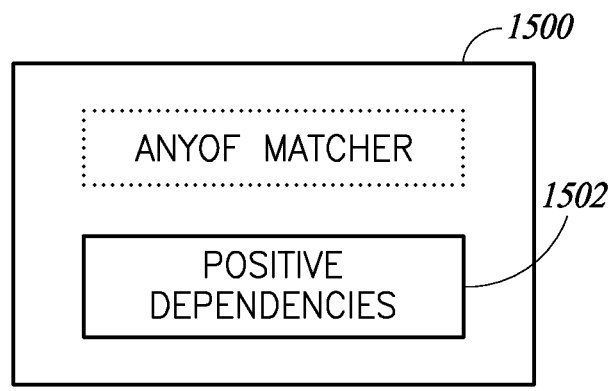
FIG. 15 shows a schematic block diagram for an AnyOf matcher, according to one illustrated implementation.

FIG. 15 shows an AnyOf matcher 1500 which comprises positive dependencies 1502. The AnyOf matcher 1500 is a trivial matcher which passes all matches along to its observing matchers. That is, the AnyOf matcher 1500 acts like a logical OR. A positive dependency is a dependency where the presence of an object is required, rather than exclusion of the object, which is referred to herein as a negative dependency.

Figure 16:
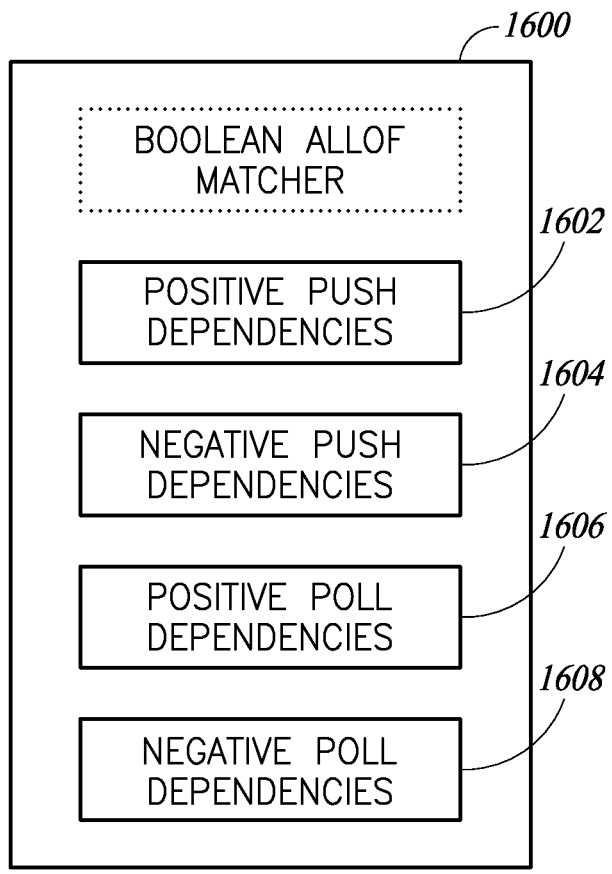
FIG. 16 shows a schematic block diagram for a boolean AllOf matcher, according to one illustrated implementation.

FIG. 16 shows a boolean AllOf matcher 1600 which comprises positive push dependencies 1602, negative push dependencies 1604, positive poll dependencies 1606 and negative poll dependencies 1608. The boolean AllOf matcher 1600 acts like a logical OR, and matches if all positive dependencies match and no negative dependencies match.

An example algorithm for implementing the boolean AllOf matcher 1600 is as follows:

```
function void consumePositiveMatch(dependency, match, state):
    state.addPositiveMatch(dependency, match)
    if all positive push dependencies have been found:
        add all positive poll dependencies to state and
        start observing all positive poll dependencies
    if matches for all positive dependencies have been found:
        effectiveMatch = if has no negative dependencies then use
match
    else buildConditioanlMatch(match, state)
        notifyObserversOfMatch(effectiveMatch)
function void consumeNegativeMatch(dependency, match, state):
state.addNegativeMatch(dependency, match)
function Match buildConditionalMatch(match, state):
    return new ConditionalMatch(match,
        {state has no negative matches})
```

Figure 17:
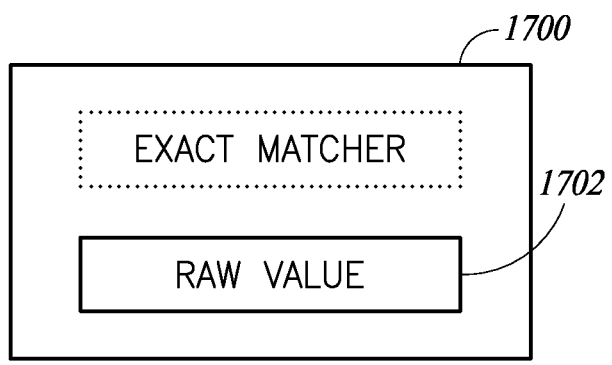
FIG. 17 shows a schematic block diagram for an Exact matcher, according to one illustrated implementation.

FIG. 17 shows an Exact matcher 1700 which comprises a raw value 1702. The Exact matcher 1700 is a matcher which only triggers when the raw value 1702 of a token matches the desired value. The Exact matcher 1700 may be used for case sensitivity matches. Since words are normalized to their lower case form to provide a routing value, a raw value check is used for case sensitive matches.

For example, supposed a user wants to match the exact word "MONSTER." If an input has the word "MONSTER," the tokenizer 104 creates a token with the normalized routing value of "monster" and the raw value of "MONSTER." The token router 202 routes the token to a "monster" atomic matcher in the matching tree of the matching engine. The atomic matcher may then notify the MONSTER Exact matcher, which verifies that the raw value of the token is in fact "MONSTER."

Figure 18:
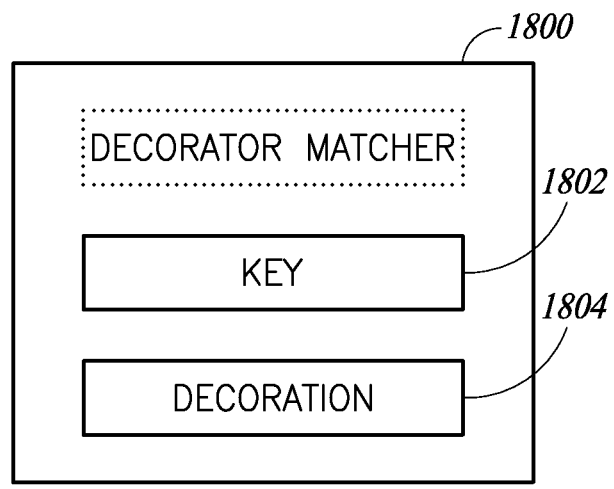
FIG. 18 shows a schematic block diagram for a decorator matcher, according to one illustrated implementation.

FIG. 18 shows a decorator matcher 1800 which comprises a key 1802 and a decoration 1804. The decorator matcher 1800 is a matcher that passes all matches along to its observing matchers but decorates the match with a key-value pair first. This functionality is useful in a number of contexts. First, this feature may be used during query merging to determine to which query a match belongs. Second, this feature may also be used during nested sub-matcher bridging, as discussed below.

Figure 19:
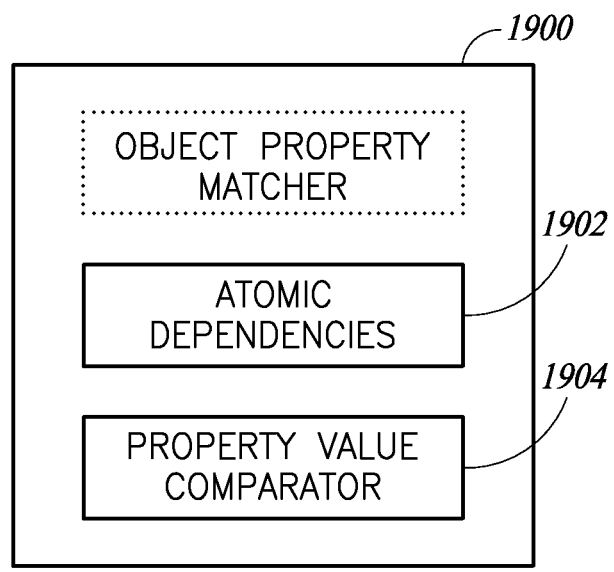
FIG. 19 shows a schematic block diagram for an object property matcher, according to one illustrated implementation.

FIG. 19 shows an object property matcher 1900 which comprises atomic dependencies 1902 and a property value comparator 1904. Objects are typically tokenized into name-value pairs. The object property matcher subscribes to the atomic dependency 1902 that corresponds to the properties name. For example, a user may have an "age" property with a value of 42. This may be tokenized as {key=age, value=42}. The object property matcher 1900 observes the "age" atomic dependency 1902 and passes 42 to the property value comparator 1904. An example algorithm for implementing the object property matcher 1900 is:

```
function void consumePositiveMatch(dependency, match, state):
    if property value comparator matches
match.getToken( ).getRawValue( ):
        notifyObserversOfMatch(effectiveMatch)
```

Note that in some implementations the object property matcher 1900 is only used for low-cardinality inputs. For large cardinality inputs (e.g., text), a more complex process may be implemented.

Figure 20:
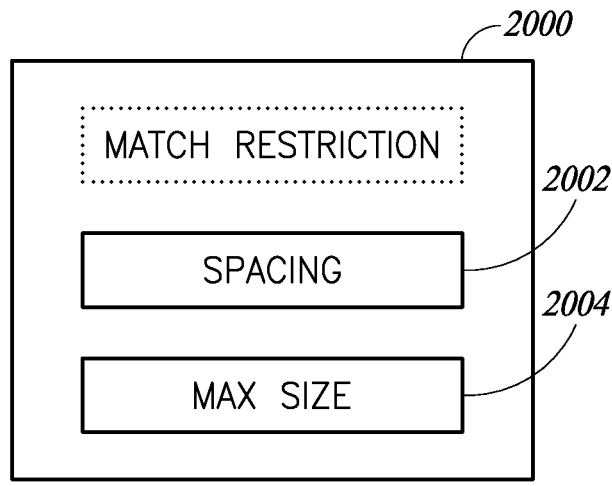
FIG. 20 shows a schematic block diagram for an unordered cluster span matcher, according to one illustrated implementation.

FIG. 20 shows an example of match restrictions 2010 which comprise a spacing restriction 2000 and a maximum size restriction 2002. Matching restrictions 2010 are used by cluster and phrase matchers, discussed below, to ensure that a span is a legal match. As used herein, a span is the range of tokens which corresponds to a match. For example, [Cluster A C] will match the span "C B A" for the input of "X Y Z C B A D." The maximum spacing restriction 2000 is the maximum number of tokens which can be between any two tokens. The maximum size restriction 2002 is the maximum number of tokens allowed in the span.

Figure 21:
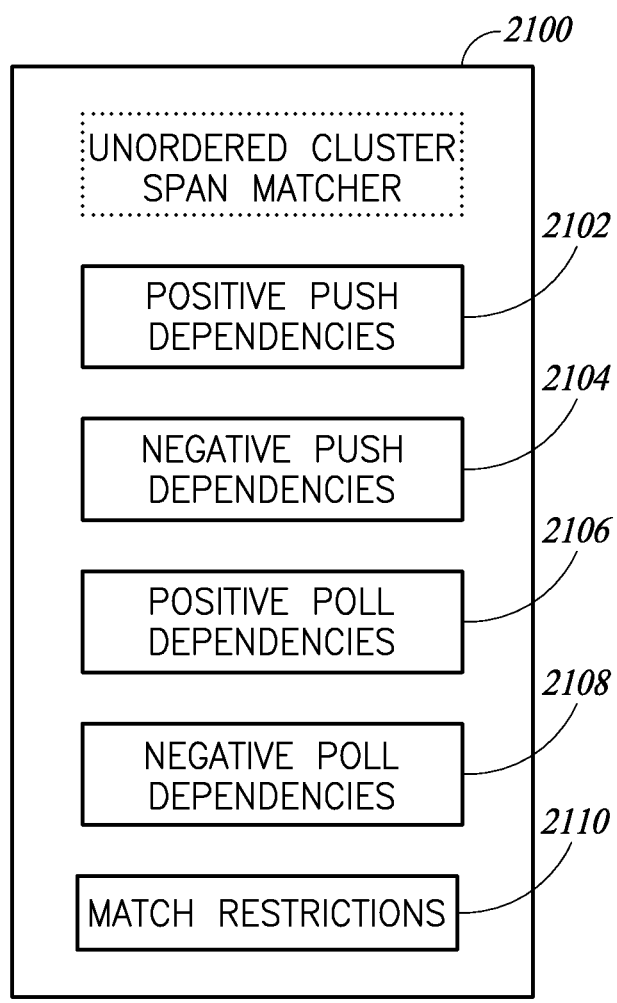
FIG. 21 shows a schematic block diagram for an example match restriction, according to one illustrated implementation.

FIG. 21 shows an unordered cluster span matcher 2100 which comprises positive push dependencies 2102, negative push dependencies 2104, positive poll dependencies 2106, negative poll dependencies 2108, and match restrictions 2110 (see FIG. 20). The unordered cluster span matcher 2100 acts like a logical AND but with additional token spacing and span size restrictions. The unordered cluster span matcher 2100 matches if all positive dependencies 2102 and 2106 match and satisfy the matching restriction 2110 and no negative dependencies 2104 and 2108 match within the positive span. An example algorithm for implementing the unordered cluster span matcher 2100 is:

```
function void consumePositiveMatch(dependency, match, state):
    state.addPositiveMatch(dependency, match)
    if all positive push dependencies have been found:
        add all positive poll dependencies to state and
        start observing all positive poll dependencies
notifyObserversOfMatches(effectiveMatches)
function void consumeNegativeMatch(dependency, match, state):
state.addNegativeMatch(dependency, match)
function Match buildConditionalMatch(match, state):
    return new ConditionalMatch(match,
        {state has no valid negative matches within the
        span defined by the match})
```

As an example, consider the input: "A B C E F G." The query [Cluster (spacing=1) A C] matches because the span "A B C" has a cluster of "A" and "C" and only one token between them "B." The query [Cluster (spacing=0) A C] does not match because there is never an occurrence of "A" followed by zero tokens, and then "C." The query [Phrase (maxSize=3) A C] matches because the span "A B C" has a sequence of "A" and "C" and the number of tokens in the span is 3. The query [Phrase (maxSize=2) A C] does not match because "A B C" has more than two tokens.

Figure 22:
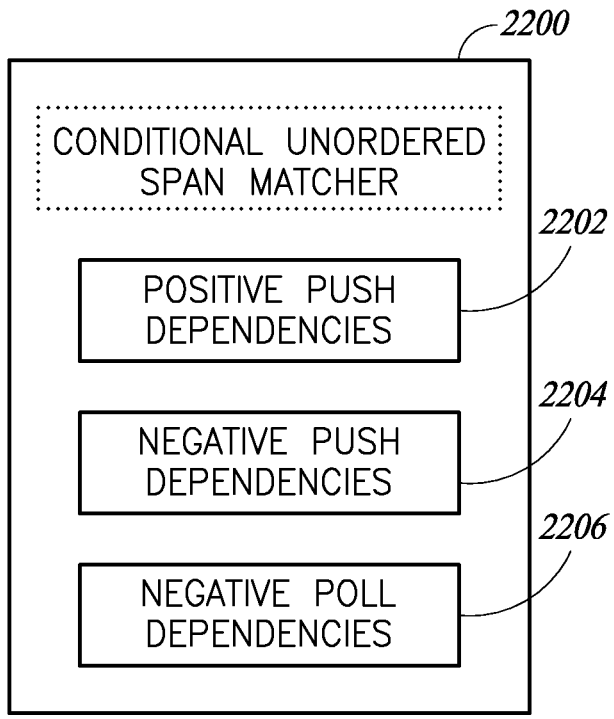
FIG. 22 shows a schematic block diagram for a conditional unordered span matcher, according to one illustrated implementation.

FIG. 22 shows a conditional unordered span matcher 2200 which comprises positive push dependencies 2202, negative push dependencies 2204, and negative poll dependencies 2206. The conditional unordered span matcher 2200 matches spans where any of the positive matches are true but where the span itself does not contain any negative matchers. An example algorithm for implementing a conditional unordered span matcher 2200 is as follows:

```
function void consumePositiveMatch(dependency, match, state):
    effectiveMatch = if has no negative dependencies then use match
    else buildConditioanlMatch(match, state)
    notifyObserversOfMatch(effectiveMatch)
function void consumeNegativeMatch(dependency, match, state):
state.addNegativeMatch(dependency, match)
function Match buildConditionalMatch(match, state):
    return new ConditionalMatch(match, {state has no negative matches
that occur within the bounds of match})
```

Figure 23:
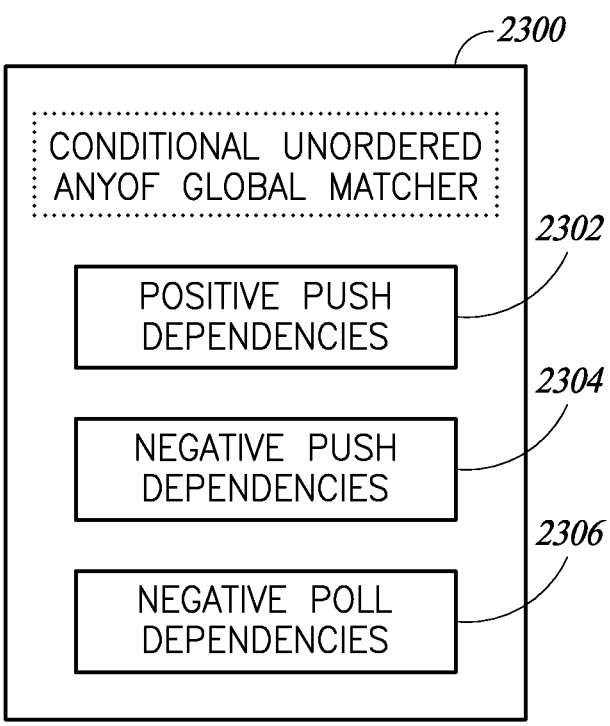
FIG. 23 shows a schematic block diagram for a conditional unordered AnyOf Global matcher, according to one illustrated implementation.

FIG. 23 shows a conditional unordered AnyOf Global matcher 2300 which comprises positive push dependencies 2302, negative push dependencies 2304, and negative poll dependencies 2306. The conditional unordered AnyOf Global matcher 2300 matches spans where any of the positive matches are true but where none of the negative matchers produce a match for the entire input (i.e., no negative matches were found). An example algorithm for implementing a conditional unordered AnyOf Global matcher 2300 is:

```
function void consumePositiveMatch(dependency, match, state):
    effectiveMatch = if has no negative dependencies then use match
    else buildConditioanlMatch(match, state)
    notifyObserversOfMatch(effectiveMatch)
function void consumeNegativeMatch(dependency, match, state):
state.addNegativeMatch(dependency, match)
function Match buildConditionalMatch(match, state):
    return new ConditionalMatch(match, {state has no negative
matches})
```

Figure 24:
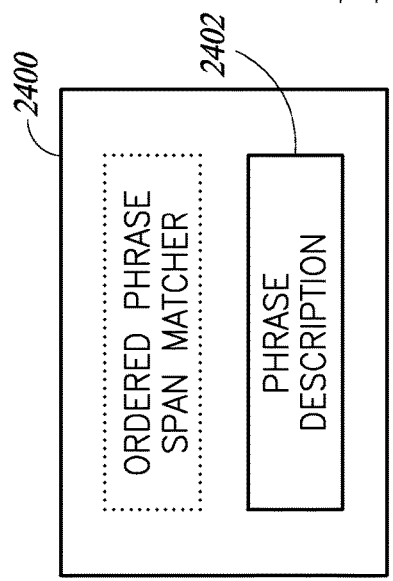
FIG. 24 shows a schematic block diagram for an ordered phrase span matcher, according to one illustrated implementation.

FIG. 24 shows an ordered phrase span matcher 2400 which includes a phrase description 2402. The ordered phrase span matcher 2400 matches tokens in a certain ordering, taking token spacing and span size into account. Also, negative dependencies (e.g., "excludes") are ordered as well. Thus, the query [Phrase A [Exclude B] C] will match "B A C" but not "A B C." An example algorithm for implementing an ordered phrase span matcher 2400 is:

```
function void consumePositiveMatch(dependency, match, state):
    state.addPositiveMatch(dependency, match)
    if all positive push dependencies have been found:
        add all positive poll dependencies to state and
        start observing all positive poll dependencies
notifyObserversOfMatches(effectiveMatches)
function void consumeNegativeMatch(dependency, match, state):
state.addNegativeMatch(dependency, match)
```

Figure 25:
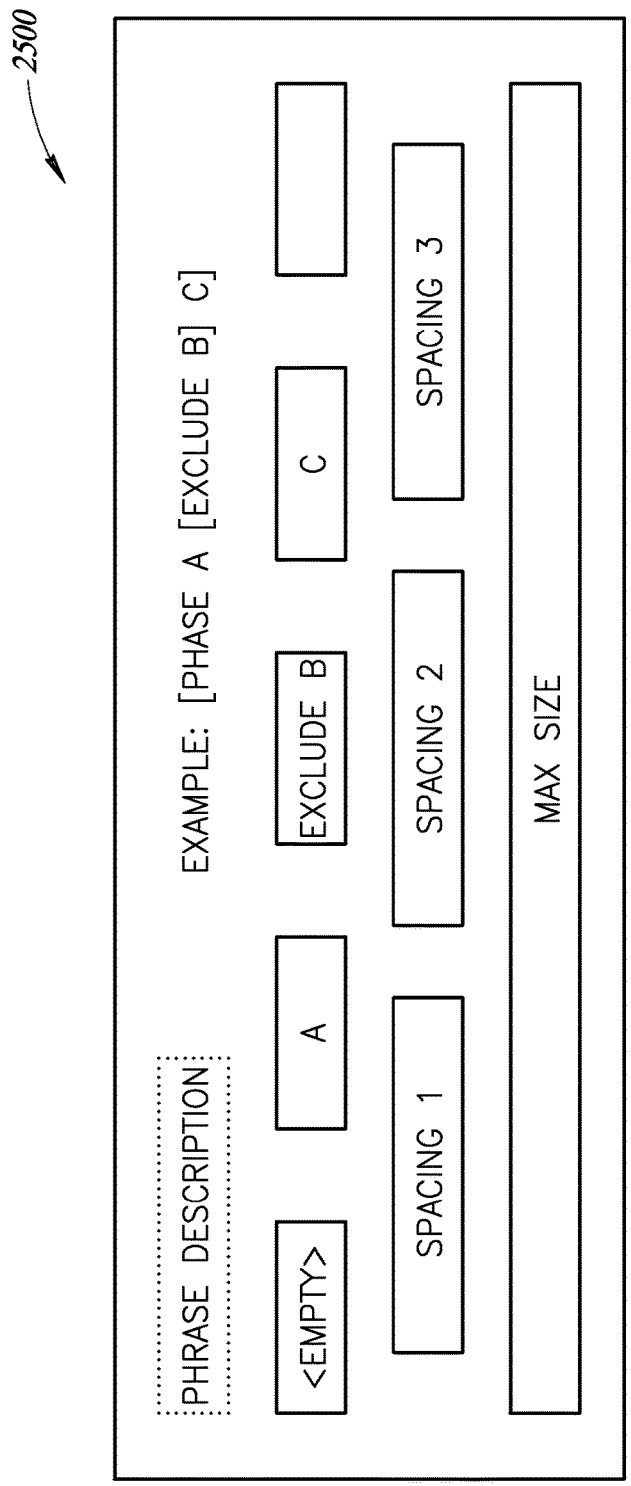
FIG. 25 shows a diagram of an example phrase description for an input query, according to one illustrated implementation.

As shown in an example diagram 2500 of FIG. 25, phrase descriptions define restrictions that a match must satisfy to be considered valid. In general, each positive match slot is surrounded by optional exclusions. Additionally, spacing restrictions may be supplied for the leading/trailing match slots and between all positive match slots.

Figure 26:
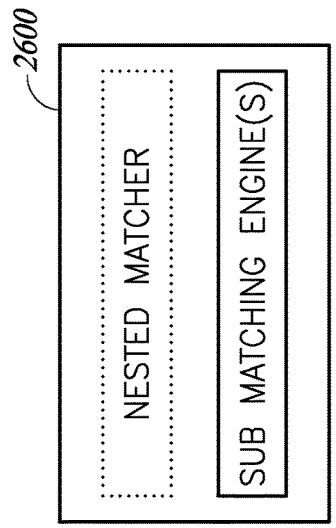
FIG. 26 shows a schematic block diagram for a nested matcher, according to one illustrated implementation.

FIG. 26 shows a nested matcher 2600 which includes one or more sub-matching engines 2602. Nested matchers 2600 encapsulate entire matching engines and then route any internal matches to the appropriate matchers within the matching context 206 (FIG. 2). An example algorithm for implementing a nested matcher 2600 is:

```
function void consumePositiveMatch(dependency, match, state):
    nestedMatches = subFME.match(match.token.rawValue)
    for match in nestedMatches:
        observer = match.getNestedRoutingMatchingDecoration
        notifyObseverOfmatch(observer, new NestedMatch(match))
```

It is noted that at the compiler level, all nested matches for a given property may be merged into a single matching engine.

Figure 27:
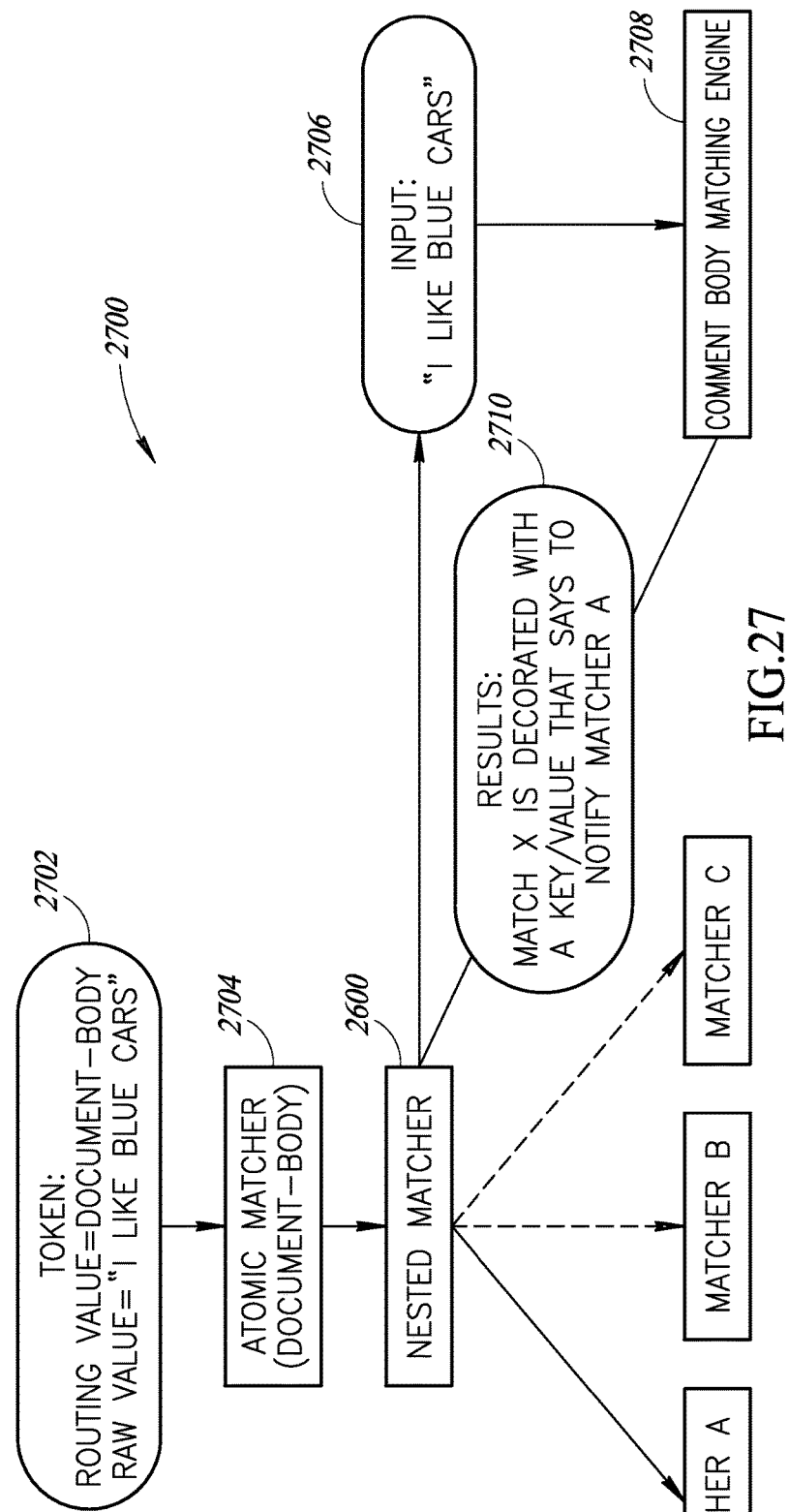
FIG. 27 shows a flow diagram of a method of operation for a nested matcher, according to one illustrated implementation.

FIG. 27 shows a flow diagram of a method 2700 of operation for a nested matcher, such as the nested matcher 2600 of FIG. 26. An atomic matcher 2704 receives an input token 2702 which has a routing value equal to "document-body" and a raw value equal to "I like blue cars."

The nested matcher 2600 receives the input 2706 of the comment body which is sent to a comment body matching engine 2708 of the nested matcher 2600. In this example, a result 2710 is provided which decorates a match X with a key/value that indicates to notify a matcher A. The result 2710 is returned to the nested matcher 2600, which notifies the matcher A of the result without having to notify other matchers (e.g., matcher B, matcher C). In the example of FIG. 27, the comment body is only passed through a single matching engine.

Figure 28:
FIG. 28 shows a schematic block diagram for a unique NoOp matcher, according to one illustrated implementation.

FIG. 28 shows a unique NoOp matcher 2800. The unique NoOp matcher 2800 is a trivial matcher that passes all matches along to its observing matchers. The unique NoOp matcher 2800 is different from the AnyOf matcher 1500 in that the NoOp matcher is never equal to any matcher other than itself. The NoOp matcher 28000 may used for bridging nested matchers to higher level matchers.

Figure 29:
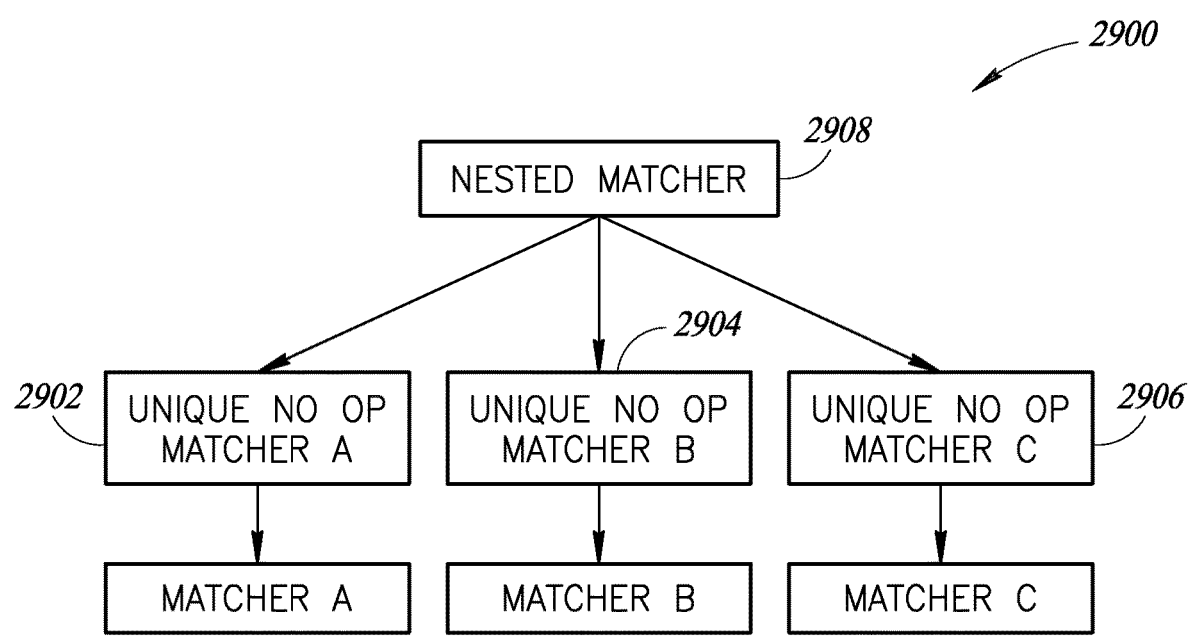
FIG. 29 shows a schematic block diagram of a matching tree which includes unique NoOp matchers, according to one illustrated implementation.

For example, as shown in a matching tree 2900 of FIG. 29, without unique NoOp matchers 2902, 2904, and 2906, matchers A, B, and C, respectively, could be considered equal by a nested matcher 2908 since the matchers A, B, and C would otherwise share a common dependency.

Figure 30:
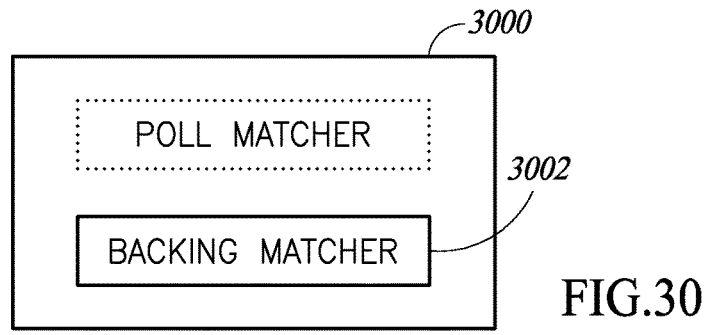
FIG. 30 shows a schematic block diagram for a poll matcher, according to one illustrated implementation.

FIG. 30 shows a poll matcher 3000 which comprises a backing matcher 3002. Poll Matchers 3000 or "silent matchers" are matchers which do not notify their observers by default. Instead, poll matchers 3000 store all matches in a dynamic state that can be queried by their observers. Observers can also dynamically subscribe to poll matches if needed. Examples of the user of poll matchers are provided below with reference to FIGS. 31 and 32.

Figure 31:
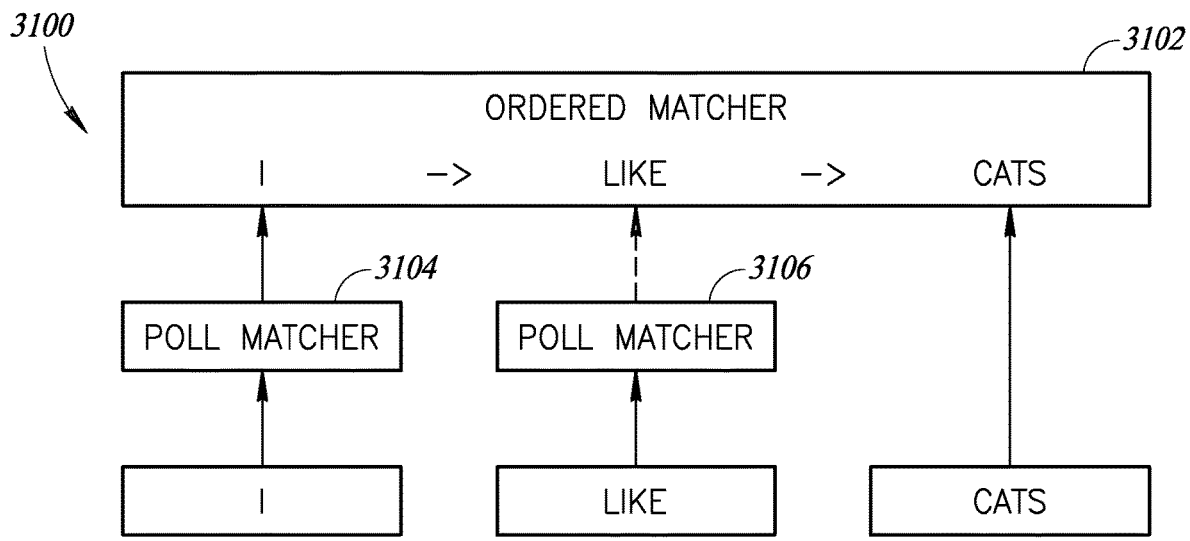
FIG. 31 shows a matching tree which illustrates an example use of a poll matcher, according to one illustrated implementation.

FIG. 31 shows a matching tree 3100 which illustrates an example use of a poll matcher. In this example, an ordered phrase matcher 3102 is provided which matches the ordered phrase "I like cats." Poll matchers 3104 and 3106 have been added for the relatively common words "I" and "like," respectively, whereas a poll matcher is not used for the relatively uncommon word "cats." In operation, the ordered phrase matcher 3102 is only notified of a match if the word "cats" is found. At that time, the ordered matcher 3102 requests any cached matches from the poll matchers 3104 and 3106 for the words "I" and "like," respectively.

Figure 32:
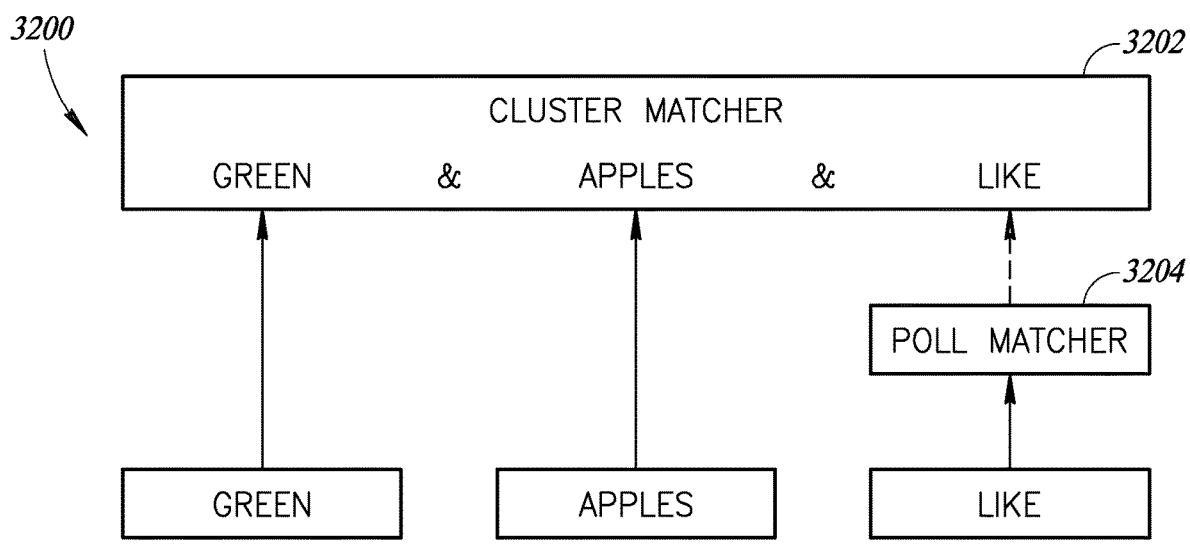
FIG. 32 shows a matching tree which illustrates another example use of a poll matcher, according to one illustrated implementation.

FIG. 32 shows a matching tree 3200 which illustrates another example use of a poll matcher. In this example, an unordered cluster matcher 3202 is provided which matches the cluster of "green," "apples," and "like." A poll matcher 3204 has been added for the relatively common word "like," whereas a poll matcher is not used for the relatively uncommon words "green" and "apples." In operation, the cluster matcher 3202 is only notified of a match if either the word "green" or the word "apples" is found. At that time, the cluster matcher 3202 requests any cached matches from the poll matcher 3204 for the word "like," and the cluster matcher would also subscribe to the "like" poll matcher 3204 for any future occurrences of the word "like."

Figure 33:
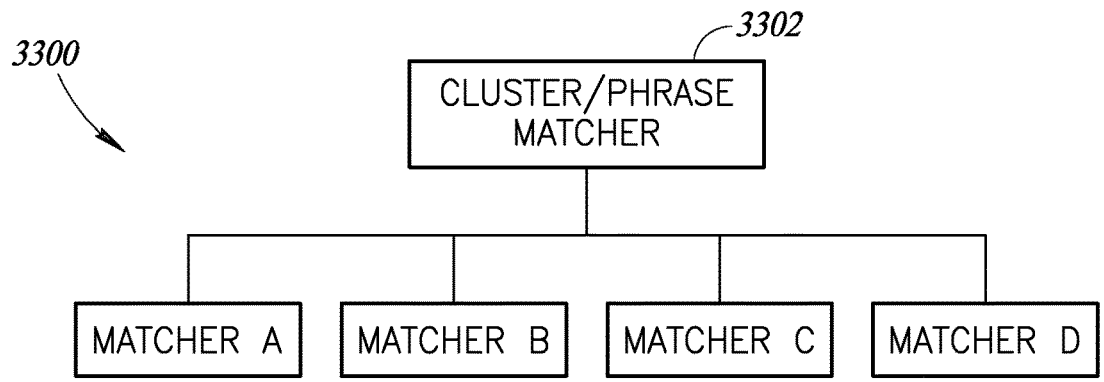
FIG. 33 shows an example matching tree which includes a cluster or phrase matcher which observes four matchers, according to one illustrated implementation.
Figure 34:
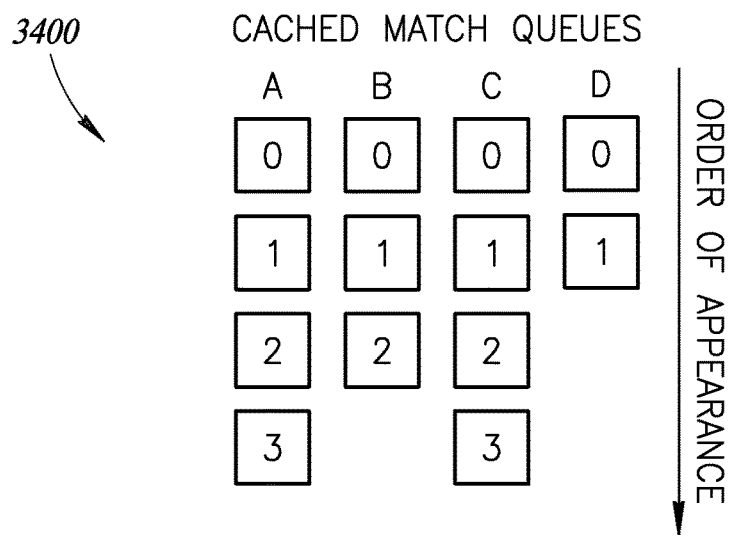
FIG. 34 shows a table of cached match queues for the four matchers shown in FIG. 33, according to one illustrated implementation.

FIG. 33 shows an example matching tree 3300 which includes a cluster or phrase matcher 3302 which observes four matchers: matcher A, matcher B, matcher C and matcher D. FIG. 34 shows a table 3400 of cached match queues for the matchers A-D arranged top-down in order of appearance for an input token stream. The cluster/phrase matcher 3302 requires that one match be selected from each of its positive dependencies. The cluster/phrase matcher 3302 keeps a running queue of positive push matches and will request poll matcher queues once the last push matcher has triggered. These match queues are appended only and thus stay ordered.

An index array is created for each queue and is initialized to the highest index for its respective queue. In the example of FIG. 34, that array would be [3, 2, 3, 1]. Then, the matching engine iterates backwards, selecting the next combination that would move the span the least to the right while keeping the triggering match queue fixed (to prevent finding older unrelated matches). For each of these iterations, the matching engine checks to see if the match restrictions are valid. This process may be repeated until no more matches can be found or some arbitrary limit of matches is reached.

Negative matchers may be checked during an "isValid" method call on a generated conditional match.

An example algorithm for implementing this functionality may be as follows:

```
function notifyAllObserversOfNewMatches(context, match, matcherState):
    childMatchesBuffer = new Match[matcherState.positiveMatchBuckets.size( )]
    positiveMatchBucketIndexes = new int[matcherState.positiveMatchBuckets.size( )]
    for (int i = 0; i < positiveMatchBucketIndexes.length; i++):
        positiveMatchBucketIndexes[i] = matcherState.positiveMatchBuckets.get(i).size( ) - 1
    childMatchesBuffer[positiveIndex] = match
    boolean hasMore = true
    for (int matchCount = 0; matchCount < matchThrottleLimit && hasMore;):
        buildNewCompositeMatchChildren(matcherState, childMatchesBuffer, positiveMatchBucketIndexes)
        childrenMatches = childMatchesBuffer
        spanningCompositeMatch = new SpanningCompositeMatch(childrenMatches)
        matchCount++
        container.notifyAllObserversOfMatch(context, spanningCompositeMatch)
        hasMore = advancePositiveMatchBucketIndexes(matcherState, positiveMatchBucketIndexes)
    private boolean advancePositiveMatchBucketIndexes(final MyState matcherState, final int[] positiveMatchBucketIndexes) {
        for (int i = 0; ; i++):
            if (i == positiveIndex): continue
            if (i == positiveMatchBucketIndexes.length): return false
            bucketAtIndex = matcherState.positiveMatchBuckets.get(i)
            if (positiveMatchBucketIndexes[i] > 0):
                positiveMatchBucketIndexes[i]--
                break
            else:
                positiveMatchBucketIndexes[i] = bucketAtIndex.size( ) - 1
                continue
        return true
```

Figure 35:
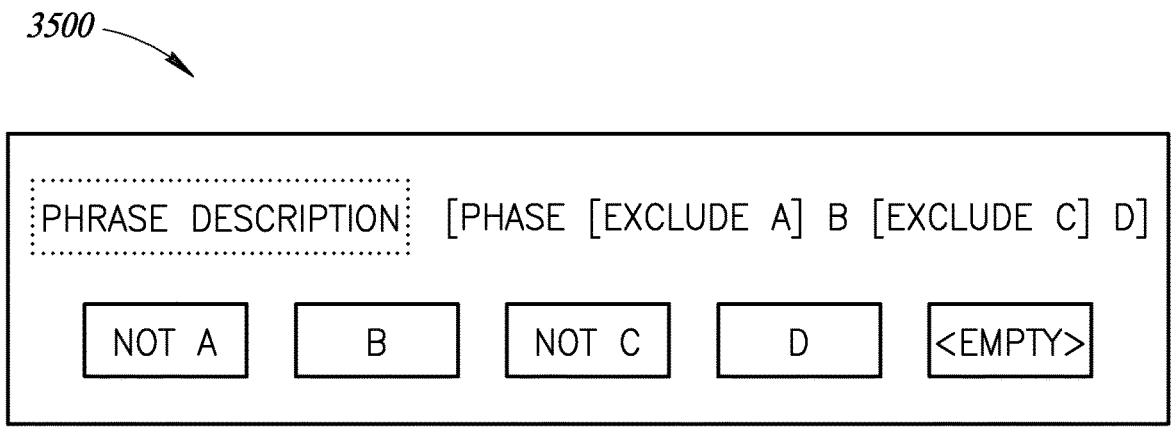
FIG. 35 shows a diagram for a phrase matcher, according to one illustrated implementation.

Figure 35 shows a diagram 3500 for a phrase matcher which matches B--> D but does not match "A B D" or "B C D". An example algorithm for implementing such phrase matcher may be expressed as follows:

```
function notifyAllObserversOfNewMatches(context, match, matcherState) {
    childMatchesBuffer = new Match)[description.positiveMatchers.size( )]
    childMatchesBuffer.last = match
    positiveMatchBucketIndexes = new int)[description.positiveMatchers.size( )
        - 1]
```

```
    positiveMatchBucketIndexes.last =
matcherState.positiveMatchBuckets.getLast( ).size( ) - 1
        for (int pIndex = positiveMatchBucketIndexes.length - 1; pIndex <
positiveMatchBucketIndexes.length; ):
            Match trailingMatch = childMatchesBuffer[pIndex+1]
            Match targetMatch =
matcherState.positiveMatchBuckets.get(pIndex).get(positiveMatchBucketIndexes[pIndex])
            boolean isOutOfOrder =
!trailingMatch.getGeometry( ).doesStartAfterOtherEnds(targetMatch.getGeometry( ))
            if isOutOfOrder:
                if positiveMatchBucketIndexes[pIndex]-- == 0:
                    pIndex = advancePositiveIndexes(positiveMatchBucketIndexes,
pIndex)
                else if
(!targetMatch.getLastToken( ).isTokenWithinRange(trailingMatch.getFirstToken( ), 1 +
description.spacers.get(pIndex+1)) OR
                    !targetMatch.getFirstToken( ).isTokenWithinRange(match.getLast
Token( ), description.maxSize - 1)):
                    pIndex = advancePositiveIndexes(positiveMatchBucketIndexes,
pIndex)
            else:
                childMatchesBuffer[pIndex] = targetMatch
                if pIndex == 0:
                    spanningCompositeMatch = new
SpanningCompositeMatch(ArrayAdapter.adapt(childMatchesBuffer))
                    container.notifyAllObserversOfMatch(context,
spanningCompositeMatch)
                    if positiveMatchBucketIndexes[0]-- == 0:
                        pIndex = advancePositiveIndexes(positiveMatchBucketIndexes,
0)
                else:
                    positiveMatchBucketIndexes[pIndex - 1] =
matcherState.positiveMatchBuckets.get(pIndex - 1).size( ) - 1
                    pIndex--
    function advancePositiveIndexes( positiveMatchBucketIndexes, pIndex):
        for (pIndex++; pIndex ! = positiveMatchBucketIndexeslength AND
positiveMatchBucketIndexes[pIndex]-- == 0; pIndex++){}
        return pIndex
    }
```

Figure 36:
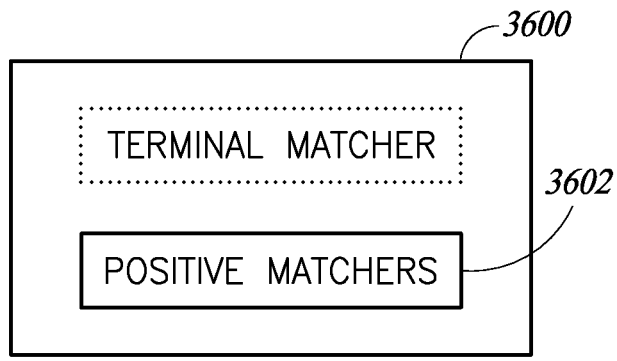
FIG. 36 shows a schematic block diagram for a terminal matcher, according to one illustrated implementation.

FIG. 36 shows a terminal matcher 3600 which comprises positive matchers 3602. A terminal matcher 3600 is the root of a matcher tree (e.g., matcher tree 200 of FIG. 2) of a matching engine. In some implementations, there is exactly one terminal matcher 3600. The terminal matcher 3600 has no observers. The terminal matcher 3600 is used to hold all matches generated by the matching tree 200. Terminal matchers 3600 expose a unique interface that allows the matching engine to access valid matches. It is noted that access to the matches may only be available after all tokens in the input have been consumed. This allows conditional matchers to have access to complete information when evaluating validity.

Figure 37:
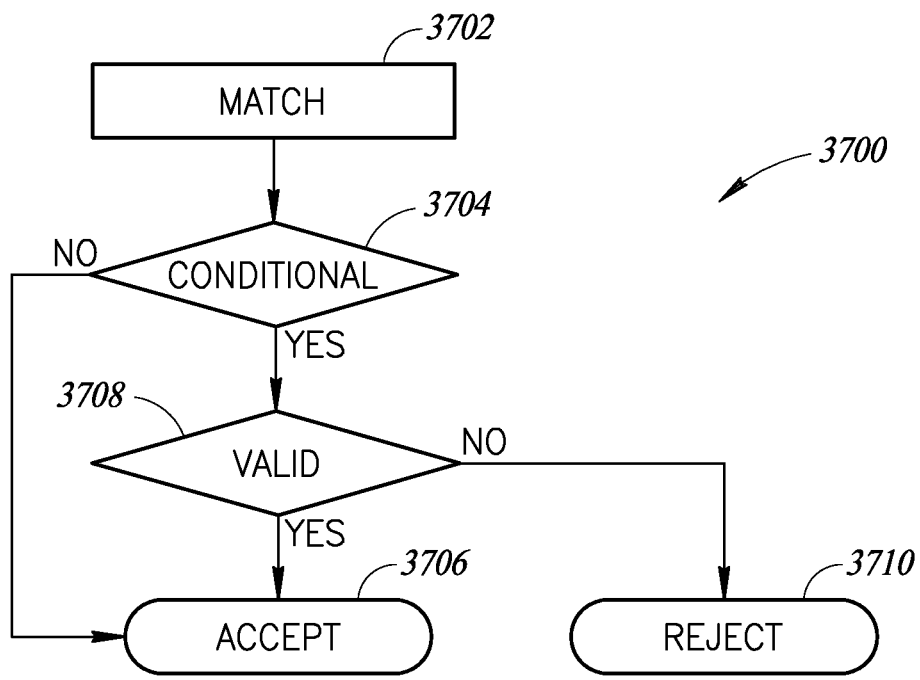
FIG. 37 is a flow diagram of a method of operation for a terminal matcher to perform match filtering on a conditional match, according to one illustrated implementation.

FIG. 37 is a flow diagram of a method 3700 of operation for a terminal matcher 3600 (FIG. 36) to perform match filtering on a conditional match. The terminal matcher first checks if a match 3702 is conditional at 3704. If the match is not conditional, the terminal matcher accepts the match at 3706. If the match is conditional, the terminal matcher checks the validity of the conditional match at 3708. If the match is valid, the terminal accepts the match at 3706. If the conditional match is invalid, the terminal matcher rejects the match at 3710.

Figure 38:
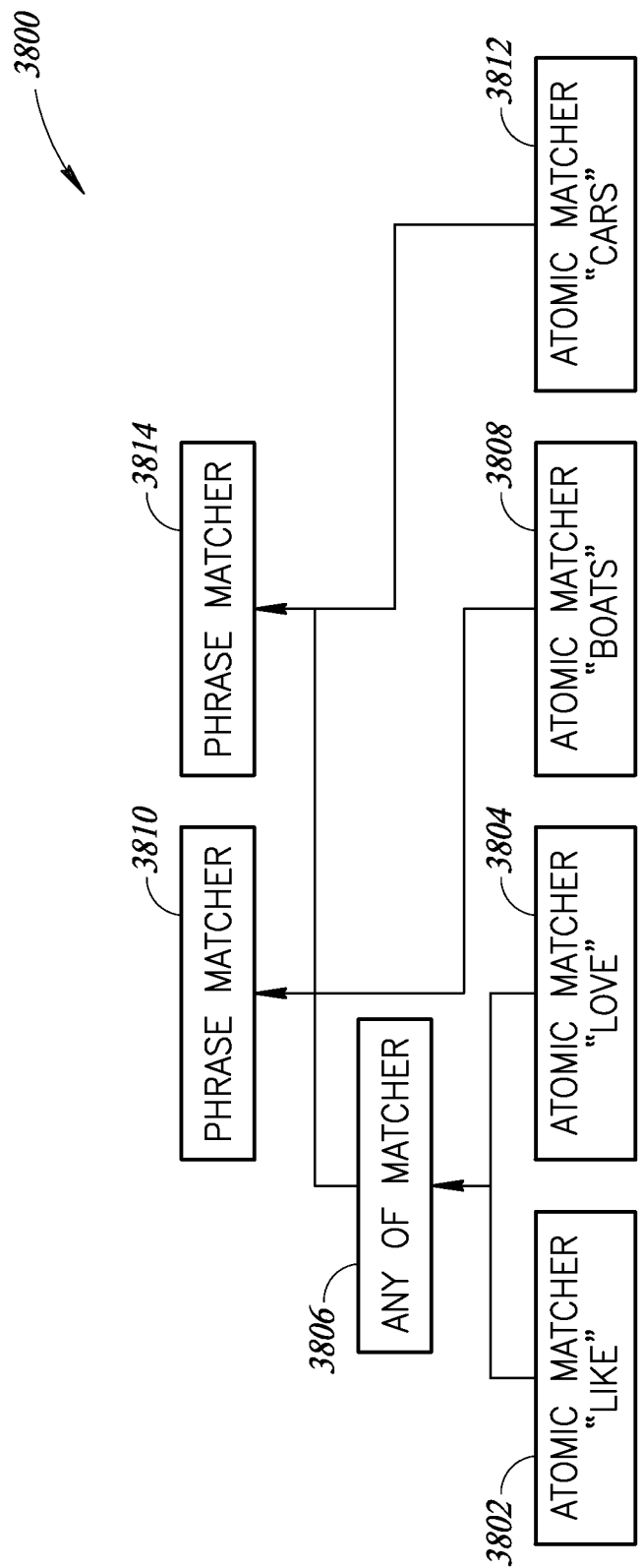
FIG. 38 shows a matcher tree which illustrates how matchers are reused to optimize a matching engine, according to one illustrated implementation.

FIG. 38 shows a matcher tree 3800 which illustrates how matchers are reused to optimize the matching engine. Generally, matchers are shared/reused when a given matcher already exists. This is accomplished by registering all matchers with a matcher container. Internally, the matcher container uses an identity hash map which allows for fast retrieval of equal valued matchers. Matcher equality and hash codes may be defined at the matcher implementation level and may be strictly defined to ensure that two functionally equivalent matchers are equal. For example, two AnyOf matchers are equal if they share equivalent (order agnostic) sets of dependencies.

In the example shown in FIG. 38, consider the following two queries:
Query A: [Phrase [AnyOf like love] boats]
Query B: [Phrase [AnyOf like love] cars]
Queries A and B share the subquery "AnyOf like love." Thus, the matching engine may share atomic matchers 3802, 3804 for "like" and "love," respectively, and an AnyOf matcher 3806 between Queries A and B. The output of the AnyOf matcher 3806 and the output of an atomic matcher 3808 for "boats" may be fed into a phrase matcher 3810 for Query A. Similarly, the output of the AnyOf matcher 3806 and the output of an atomic matcher 3812 for "cars" may be fed into a phrase matcher 3814 for Query B. Thus, by sharing/reusing matchers, computational resources are reduced.

An example algorithm for implementing such matcher reuse may include the following:

```
class MatcherContainer
    matcherIdentityMap = empty map
    function Matcher registerMatcher(matcher)
        existingMatcher =
matcherIdentityMap.findMatcher(matcher)
        if existingMatcher is not null: return existingMatcher
        matcher.registerObservers( )
        matcherIdentityMap.put(matcher, matcher)
```

The implementations discussed herein provide numerous advantages. For example, the implementations provide high precision capable of matching or rejecting any arbitrary piece of text or other objects. Further, the systems discussed herein are language aware in that they can account for one or more of conjugation, pluralization, compounding, contractions, capitalizations, verb contexts, punctuations, etc.

Moreover, compiling and matching using the systems and methods discussed herein is fast, even with thousands of queries over billions of pieces of data. Implementations of the present disclosure use a combination of techniques derived from formal language compilers, natural language tokenizers, and statistical modeling to build a matching engine which favors using memory for rare events and CPU power for common events.

Due to the aforementioned composite queries feature and no-backtracking matching algorithms, the systems discussed herein can match all queries against an input (e.g., comment) in a single pass and with very little memory usage. Such allows for correlation of thousands of queries against a comment in just a few microseconds, and also allows for systems which scale well asymptotically.

Figure 39:
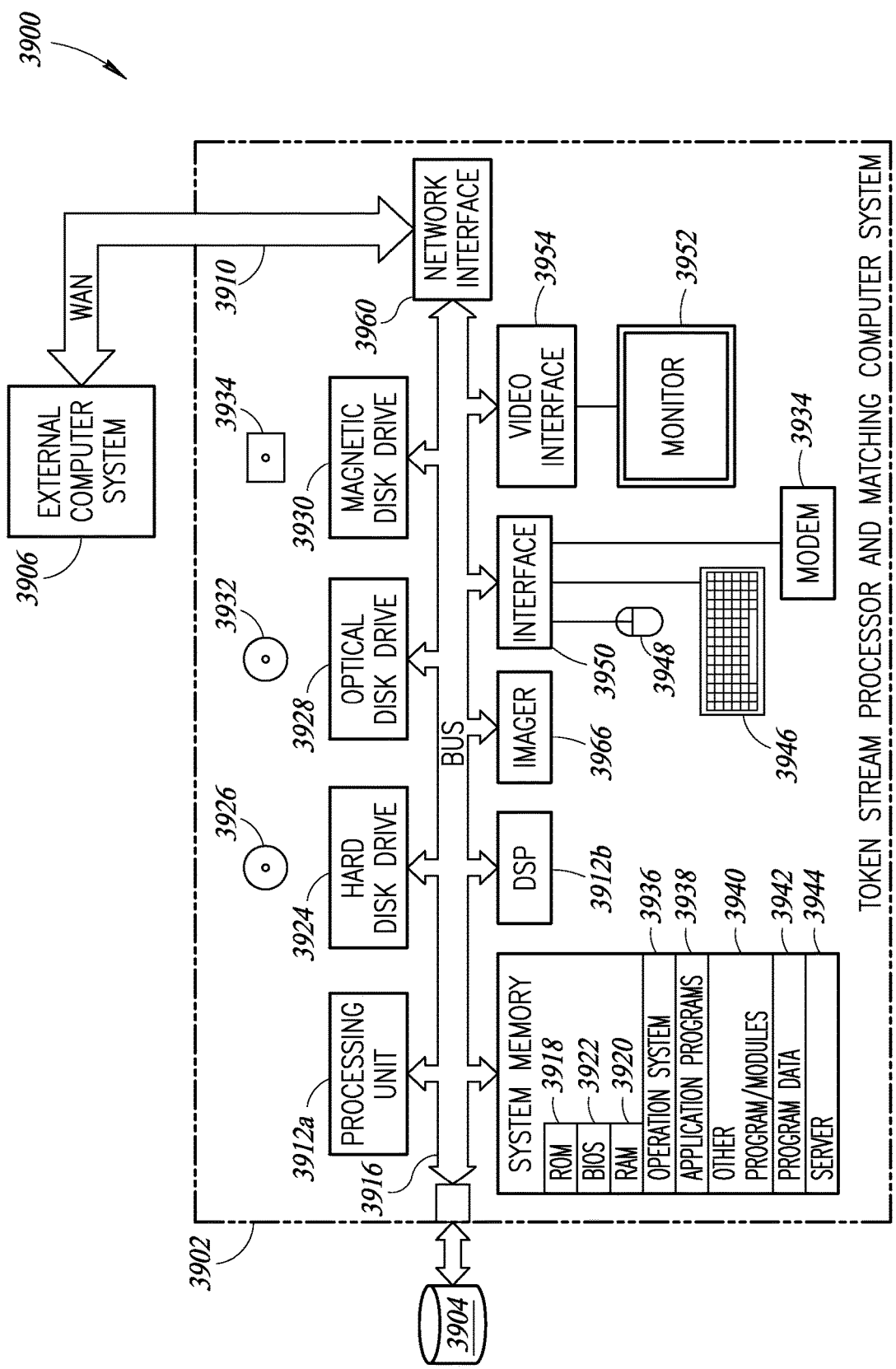
FIG. 39 shows a networked environment comprising one or more token stream processor and matching computer systems and one or more associated nontransitory computer- or processor-readable storage medium, according to one illustrated implementation.

FIG. 39 shows a networked environment 3900 comprising one or more token stream processor and matching computer systems 3902 (only one illustrated) and one or more associated nontransitory computer- or processor-readable storage medium 3904 (only one illustrated). The associated nontransitory computer- or processor-readable storage medium 3904 is communicatively coupled to the token stream processor and matching computer system(s) 3902 via one or more communications channels, for example, one or more parallel cables, serial cables, or wireless channels capable of high speed communications, for instance, via FireWire®, Universal Serial Bus® (USB) 2 or 3, Thunderbolt®, and/or Gigabit Ethernet®.

The networked environment 3900 also includes one or more external processor-based computer systems 3906 (only one illustrated). For example, the external processor-based systems 3906 may be representative of a processor-based system associated with a source of input data to be matched. The external processor-based systems 3906 are communicatively coupled to the token stream processor and matching computer system(s) 3902 by one or more communications channels, for example, one or more wide area networks (WANs) 3910, for instance the Internet or Worldwide Web portion thereof.

The networked environment 3900 may employ other computer systems and network equipment, for example, additional servers, proxy servers, firewalls, routers and/or bridges. The token stream processor and matching computer systems 3902 will at times be referred to in the singular herein, but this is not intended to limit the implementations to a single device since in typical implementations there may be more than one token stream processor and matching computer systems 3902 involved. Unless described otherwise, the construction and operation of the various blocks shown in FIG. 39 are of conventional design. As a result, such blocks need not be described in further detail herein, as they will be understood by those skilled in the relevant art.

The token stream processor and matching computer systems 3902 may include one or more processing units 3912a, 3912b (collectively 3912), a system memory 3914 and a system bus 3916 that couples various system components, including the system memory 3914 to the processing units 3912. The processing units 3912 may be any logic processing unit, such as one or more central processing units (CPUs) 3912a, digital signal processors (DSPs) 3912b, application-specific integrated circuits (ASICs), field programmable gate arrays (FPGAs), etc. The system bus 3916 can employ any known bus structures or architectures, including a memory bus with memory controller, a peripheral bus, and/or a local bus. The system memory 3914 includes read-only memory ("ROM") 3918 and random access memory ("RAM") 3920. A basic input/output system ("BIOS") 3922, which can form part of the ROM 3918, contains basic routines that help transfer information between elements within the token stream processor and matching computer system(s) 3902, such as during start-up.

The token stream processor and matching computer systems 3902 may include a hard disk drive 3924 for reading from and writing to a hard disk 3926, an optical disk drive 3928 for reading from and writing to removable optical disks 3932, and/or a magnetic disk drive 3930 for reading from and writing to magnetic disks 3934. The optical disk 3932 can be a CD-ROM, while the magnetic disk 3934 can be a magnetic floppy disk or diskette. The hard disk drive 3924, optical disk drive 3928 and magnetic disk drive 3930 may communicate with the processing unit 3912 via the system bus 3916. The hard disk drive 3924, optical disk drive 3928 and magnetic disk drive 3930 may include interfaces or controllers (not shown) coupled between such drives and the system bus 3916, as is known by those skilled in the relevant art. The drives 3924, 3928 and 3930, and their associated computer-readable media 3926, 3932, 3934, provide nonvolatile storage of computer-readable instructions, data structures, program modules and other data for the token stream processor and matching computer system 3902. Although the depicted token stream processor and matching computer systems 3902 is illustrated employing a hard disk 3924, optical disk 3928 and magnetic disk 3930, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 3914, such as an operating system 3936, one or more application programs 3938, other programs or modules 3940 and program data 3942. The system memory 3914 may also include communications programs, for example, a server 3944 that causes the token stream processor and matching computer system 3902 to serve electronic information or files via the Internet, intranets, extranets, telecommunications networks, or other networks as described below. The server 3944 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable servers may be commercially available such as those from Mozilla, Google, Microsoft and Apple Computer.

While shown in FIG. 39 as being stored in the system memory 3914, the operating system 3936, application programs 3938, other programs/modules 3940, program data 3942 and server 3944 can be stored on the hard disk 3926 of the hard disk drive 3924, the optical disk 3932 of the optical disk drive 3928 and/or the magnetic disk 3934 of the magnetic disk drive 3930.

An operator can enter commands and information into the token stream processor and matching computer system(s) 3902 through input devices such as a touch screen or keyboard 3946 and/or a pointing device such as a mouse 3948, and/or via a graphical user interface. Other input devices can include a microphone, joystick, game pad, tablet, scanner, etc. These and other input devices are connected to one or more of the processing units 3912 through an interface 3950 such as a serial port interface that couples to the system bus 3916, although other interfaces such as a parallel port, a game port or a wireless interface or a universal serial bus ("USB") can be used. A monitor 3952 or other display device is coupled to the system bus 3916 via a video interface 3954, such as a video adapter. The token stream processor and matching computer system(s) 3902 can include other output devices, such as speakers, printers, etc.

The token stream processor and matching computer systems 3902 can operate in a networked environment 3900 using logical connections to one or more remote computers and/or devices. For example, the token stream processor and matching computer systems 3902 can operate in a networked environment 3900 using logical connections to one or more external processor-based systems 3906. Communications may be via a wired and/or wireless network architecture, for instance, wired and wireless enterprise-wide computer networks, intranets, extranets, and/or the Internet. Other implementations may include other types of communications networks including telecommunications networks, cellular networks, paging networks, and other mobile networks. There may be any variety of computers, switching devices, routers, bridges, firewalls and other devices in the communications paths between the token stream processor and matching computer systems 3902 and external processor-based systems 3906.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A token stream processor and matching system, the system comprising:
   at least one nontransitory processor-readable storage medium which stores a plurality of input queries and which stores at least one input token stream comprising a plurality of ordered input tokens; and
   at least one processor communicatively coupled to the at least one nontransitory processor-readable storage medium and which implements a query compiler configured to compile the plurality of input queries into a unified matching engine which comprises a plurality of sub-matcher nodes forming a matcher tree wherein
   the unified matching engine ingests the at least one input token stream and determines which of the plurality of input queries, if any, match the at least one input token stream,
   the determination begins with a plurality of leaf sub-matcher nodes which receive the at least one input token stream and terminates in a single terminal sub-matcher node, wherein all matches are held in the single terminal sub-matcher node,
   for each of the plurality of sub-matcher nodes except for the single terminal sub-matcher node, the unified matching engine identifies any of the plurality of input queries which could be invalidated as a conditional match against the at least one input token stream, and for each conditional match, the single terminal sub-matcher node evaluates at least one invalidating condition of the conditional match,
   wherein the single terminal sub-matcher node accepts or rejects the conditional match based on the evaluation.

2. The system of claim 1, wherein at least some of the plurality of sub-matcher nodes comprise a poll sub-matcher node which notifies respective observer sub-matcher nodes of match results responsive to requests received from the respective observer sub-matcher nodes.

3. The system of claim 2, wherein at least some of the plurality of sub-matcher nodes comprises a push sub-matcher node which autonomously notifies the respective observer sub-matcher nodes of match results.

4. The system of claim 2, wherein at least some of the poll sub-matcher nodes are used for matching conditions determined to be common.

5. The system of claim 1, wherein the query compiler expands the at least one input token stream to include at least one variation of at least one token in the at least one input token stream.

6. The system of claim 5, wherein at least one token in the input token stream comprises at least one textual token, and the query compiler expands the at least one textual token to include at least one of a conjugation, pluralization, contraction, comparative, or superlative of the at least one textual token.

7. The system of claim 1, wherein the unified matching engine receives the plurality of ordered input tokens which are normalized with respect to at least one of letter case or property name.

8. The system of claim 1, wherein at least some of the plurality of input queries are associated with a first entity, and at least some of the plurality of input queries are associated with a second entity, the second entity being different from the first entity.

9. The system of claim 1, wherein the at least one input token stream comprises at least one of a text document or a complex object with multiple object properties.

10. The system of claim 1, wherein the unified matching engine generates a matching context for the at least one input token stream which stores state data and input data produced by the unified matching engine.

11. The system of claim 1, wherein at least one of the plurality of sub-matcher nodes comprises a cluster matcher node which determines that a match is present if all positive dependencies match and satisfy at least one matching restriction, the at least one matching restriction relating to at least one of token spacing or cluster span size.

12. The system of claim 1, wherein at least one of the plurality of sub-matcher nodes comprises a decoration matcher node which, for each match, decorates the match with a key-value pair and autonomously passes the match to observer sub-matcher nodes of the respective sub-matcher node.

13. The system of claim 1, wherein at least one of the plurality of sub-matcher nodes comprises an ordered phrase matcher node which matches the plurality of ordered input tokens in the at least one input token stream based at least in part on a determined ordering of the plurality of ordered input tokens.

14. A method of operating a token stream processor and matching system, the method comprising:
receiving and storing, by at least one processor, a plurality of input queries and at least one input token stream comprising a plurality of ordered input tokens;
implementing a query compiler by compiling, by the at least one processor, the plurality of input queries into a unified matching engine which comprises a plurality of sub-matcher nodes forming a matcher tree;
ingesting, by the unified matching engine, the at least one input token stream;
determining, by the unified matching engine, which of the plurality of input queries, if any, match the at least one input token stream, wherein the determination begins with a plurality of leaf sub-matcher nodes which receive the at least one input token stream and terminates in a single terminal sub-matcher node, wherein all matches are held in the single terminal sub-matcher node;
identifying, by the unified matching engine, for each of the plurality of sub-matcher nodes except for the terminal sub-matcher node, any of the plurality of input queries which could be invalidated as a conditional match against the at least one input token stream;
evaluating, by the single terminal sub-matcher node, for each conditional match, at least one invalidating condition of the conditional match; and
accepting or rejecting, by the single terminal sub-matcher node, the conditional match based on the evaluation.

15. The method of claim 14, wherein at least some of the plurality of sub-matcher nodes comprise a poll sub-matcher node which notifies respective observer sub-matcher nodes of match results responsive to requests received from the respective observer sub-matcher nodes.

16. The method of claim 15, wherein at least some of the plurality of sub-matcher nodes comprises a push sub-matcher node which autonomously notifies the respective observer sub-matcher nodes of match results.

17. The method of claim 15, wherein the poll sub-matcher node being used for matching conditions determined to be common.

18. The method of claim 14, wherein the compiling the plurality of input queries into the unified matching engine further comprises expanding the at least one input token stream to include at least one variation of at least one token in the at least one input token stream.

19. The method of claim 18, wherein at least one token in the input token stream comprises at least one textual token, and the compiling the plurality of input queries into the unified matching engine comprises expanding the at least one textual token to include at least one of a conjugation, pluralization, contraction, comparative, or superlative of the at least one textual token.

20. The method of claim 14, wherein the ingesting the at least one input token stream comprises ingesting the plurality of ordered input tokens which are normalized with respect to at least one of letter case or property name.

21. The method of claim 14, wherein at least some of the plurality of input queries are associated with a first entity, and at least some of the plurality of input queries are associated with a second entity, the second entity being different from the first entity.

22. The method of claim 14, wherein the ingesting the at least one input token stream comprises ingesting at least one of a text document or a complex object with multiple object properties.

23. The method of claim 14, wherein the determination comprises generating a matching context for the at least one input token stream which stores state data and input data produced by the unified matching engine.

24. The method of claim 14, wherein at least one of the plurality of sub-matcher nodes comprises a cluster matcher node which determines that a match is present if all positive dependencies match and satisfy at least one matching restriction, the at least one matching restriction relating to at least one of token spacing or cluster span size.

25. The method of claim 14, wherein at least one of the plurality of sub-matcher nodes comprises a decoration matcher node which, for each match, decorates the match with a key-value pair and autonomously passes the match to observer sub-matcher nodes of the respective sub-matcher node.

26. The method of claim 14, wherein at least one of the plurality of sub-matcher nodes comprises an ordered phrase matcher node which matches input tokens in the at least one input token stream based at least in part on a determined ordering of the input tokens.

* * * * *